(12) United States Patent
Micros

(10) Patent No.: US 10,336,439 B2
(45) Date of Patent: Jul. 2, 2019

(54) STEALTH DESIGN WITH MULTI-FACETED DIHEDRAL PLANFORM AND INSUFFLATION MECHANISM

(71) Applicant: Ioannis Micros, Athens (GR)

(72) Inventor: Ioannis Micros, Athens (GR)

(*) Notice: Subject to any disclaimer, the term of this patent is extended or adjusted under 35 U.S.C. 154(b) by 0 days.

(21) Appl. No.: 14/525,200

(22) Filed: Oct. 27, 2014

(65) Prior Publication Data

US 2019/0031322 A1    Jan. 31, 2019

(51) Int. Cl.
*B64C 21/02* (2006.01)
*B64D 7/00* (2006.01)
*B64C 3/16* (2006.01)

(52) U.S. Cl.
CPC .............. *B64C 21/025* (2013.01); *B64C 3/16* (2013.01); *B64D 7/00* (2013.01); *B64C 2230/04* (2013.01)

(58) Field of Classification Search
CPC ...... B64C 21/025; B64C 2230/04; B64D 7/00
See application file for complete search history.

(56) References Cited

U.S. PATENT DOCUMENTS

| | | | | | |
|---|---|---|---|---|---|
| 4,214,722 | A | * | 7/1980 | Tamura | B64C 21/025 244/207 |
| 5,255,881 | A | * | 10/1993 | Rao | B64C 21/04 244/199.1 |
| 6,866,233 | B2 | * | 3/2005 | Patel | B64C 21/025 244/204 |
| 6,892,982 | B2 | * | 5/2005 | Clark | B64C 1/0009 244/123.1 |
| 7,461,820 | B2 | * | 12/2008 | Grove | B64C 3/48 244/219 |
| 9,387,930 | B2 | * | 7/2016 | Dornwald | B64D 7/00 |

* cited by examiner

*Primary Examiner* — Brian M O'Hara
(74) *Attorney, Agent, or Firm* — George C. Pappas

(57) ABSTRACT

A stealth craft's aerodynamics and flight stability are improved with the use of a multi-faceted dihedral planform. The stealth craft includes a multi-faceted dihedral planform extending in a direction from a front to a rear of a craft (or wing) and defined by a first set of facets followed by a second set of facets. In an exemplary embodiment, the first and second sets of facets have an angle of incline that is ascending and descending, respectively, with respect to the direction of the planform. Selected ones of the first and second sets of facets are configured with insufflation slots for improving aerodynamics and stability, the insufflation slots extending spanwise in a direction transverse to the direction of the planform and provided to insufflate a fluid to form a cushion of air along the multi-faceted dihedral planform for improving aerodynamics and stability.

20 Claims, 19 Drawing Sheets

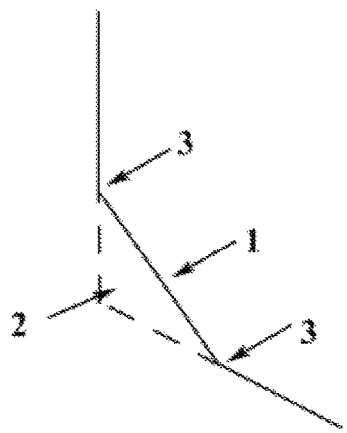
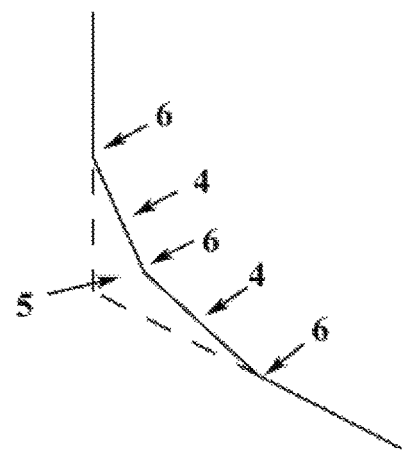
FIG. 21        FIG. 22
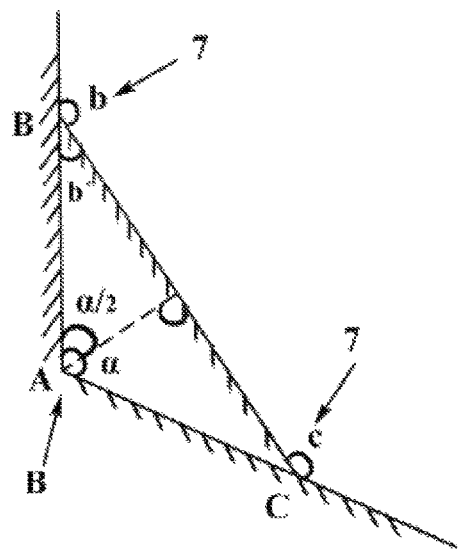
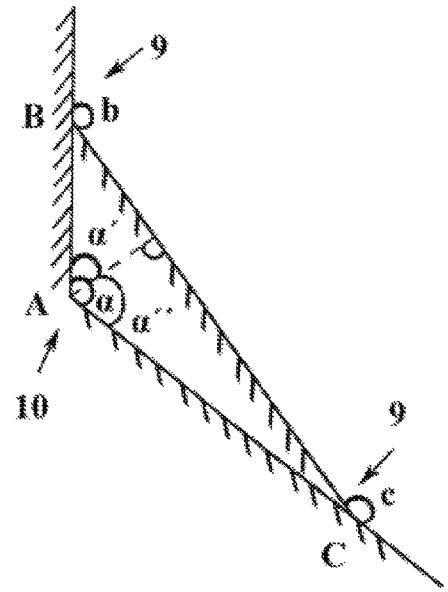
FIG. 23        FIG. 24

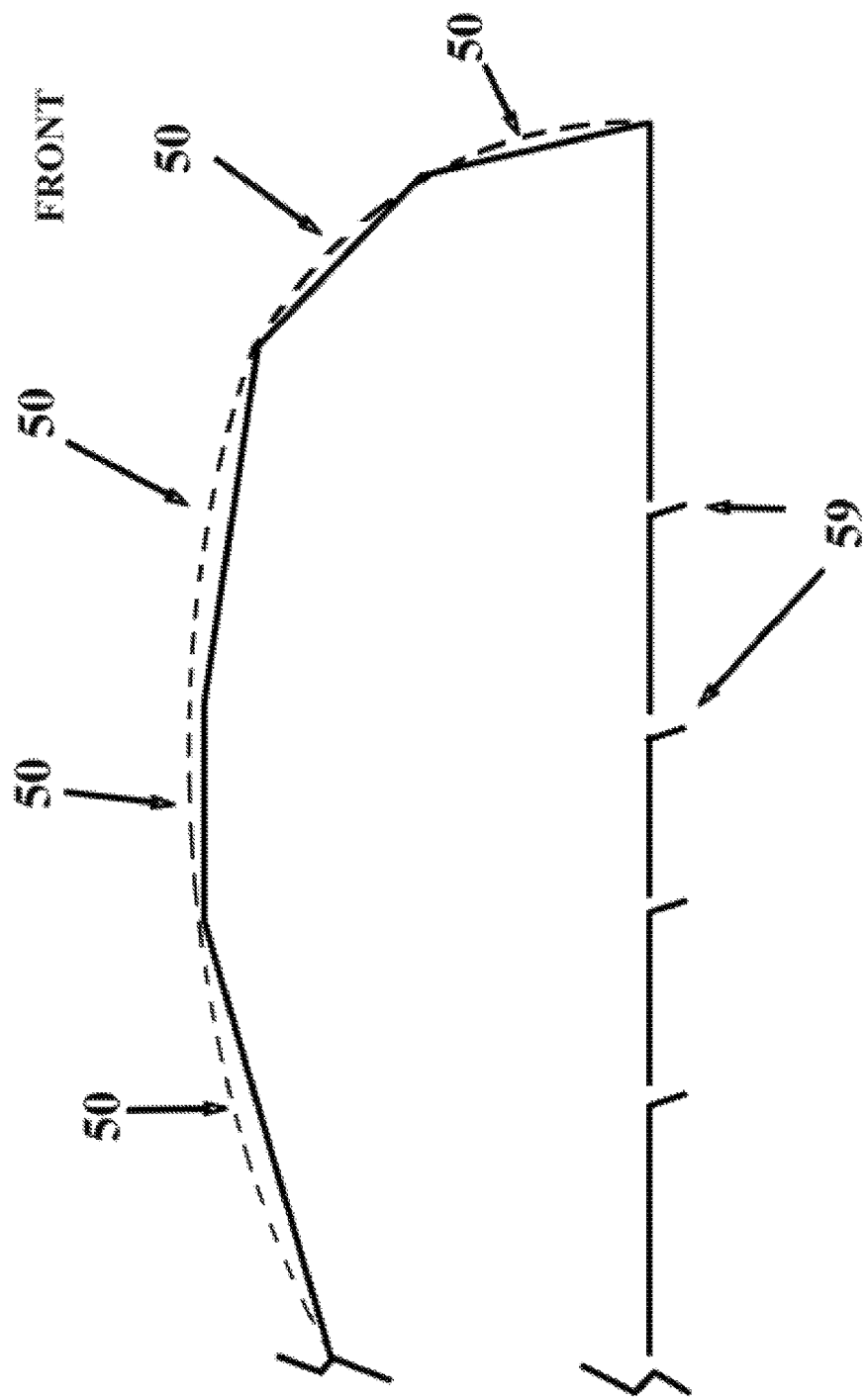

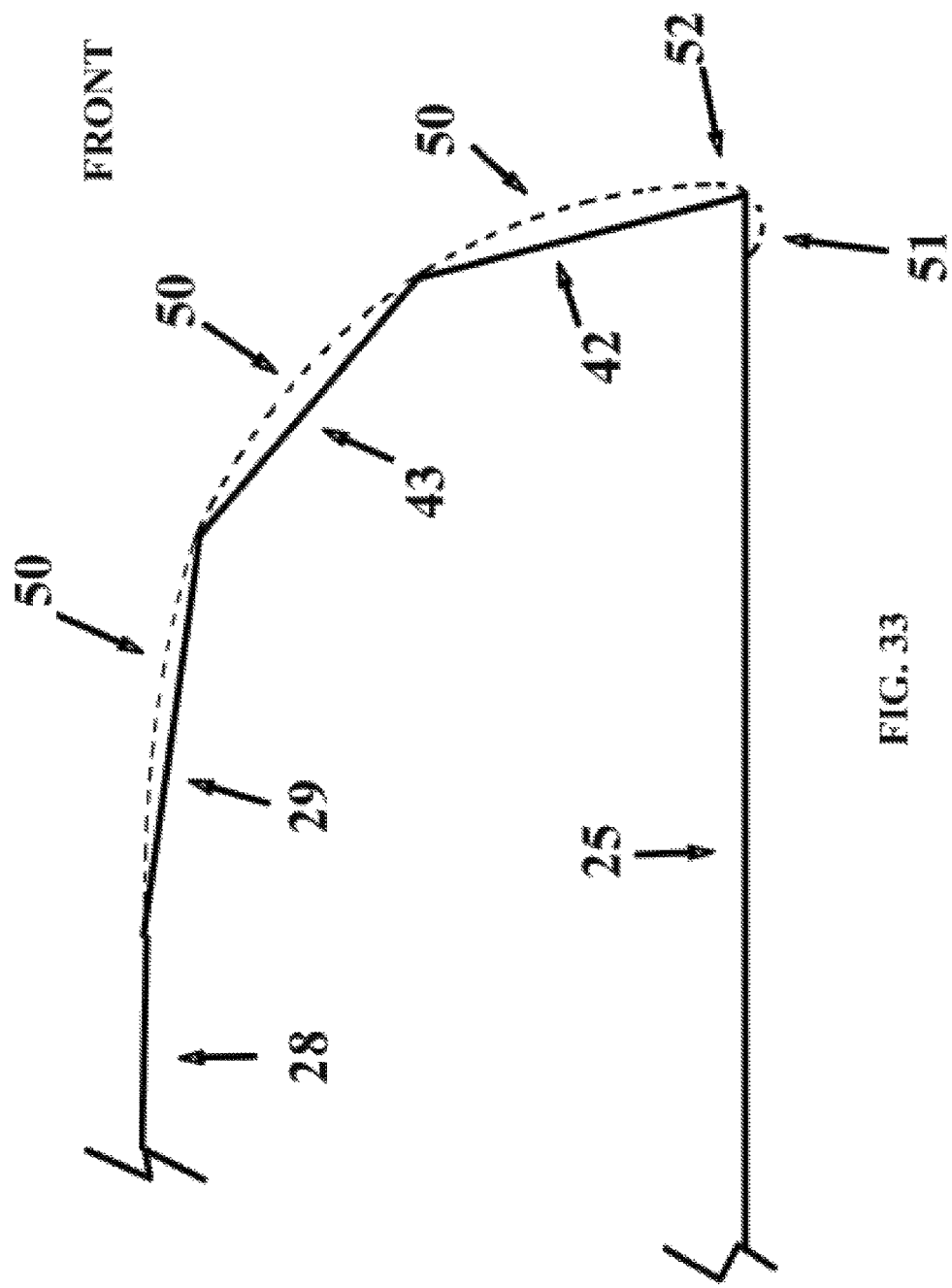

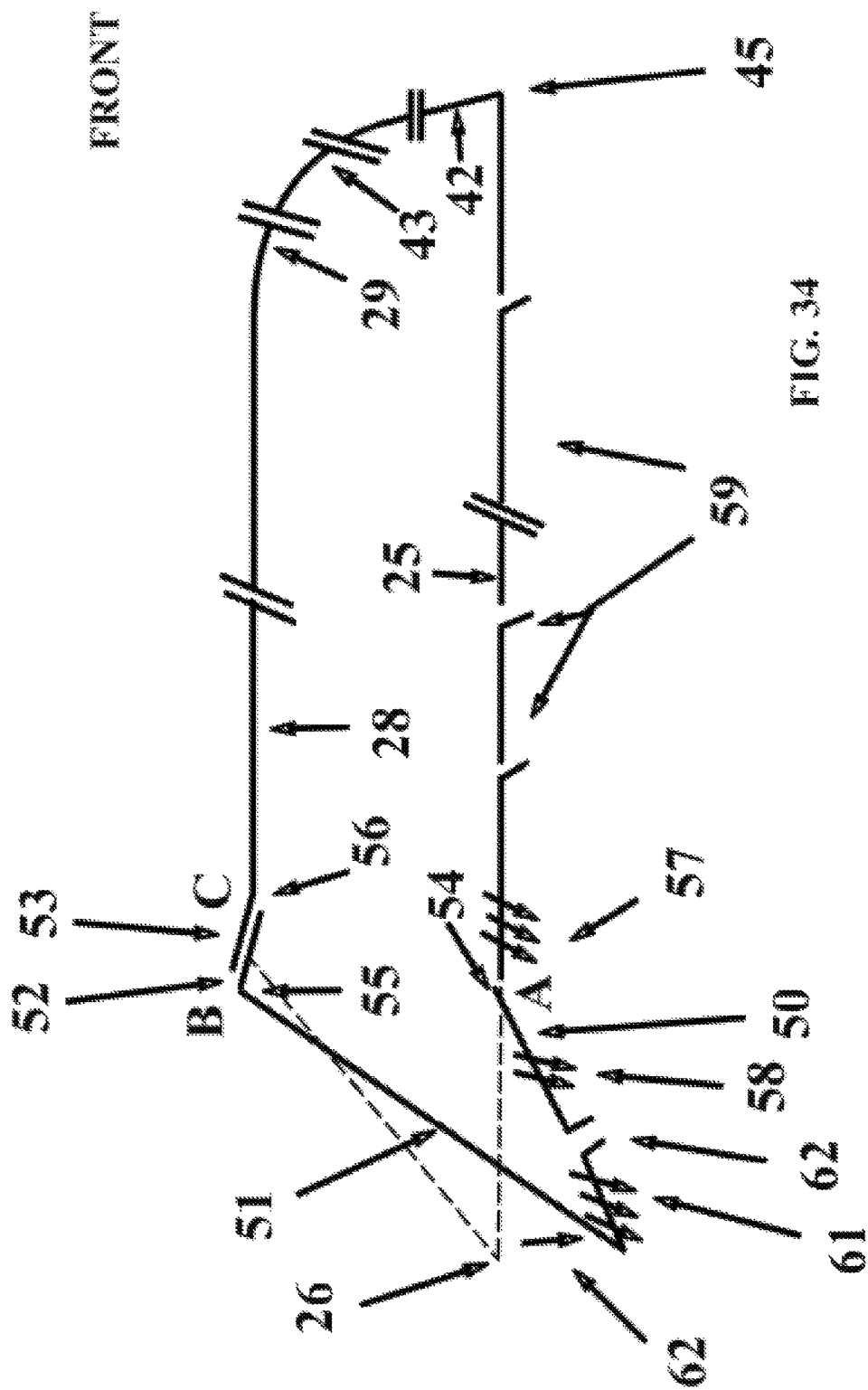

STEALTH DESIGN WITH MULTI-FACETED DIHEDRAL PLANFORM AND INSUFFLATION MECHANISM

FIELD

Claim of Priority under 35 U.S.C. § 119

The present Application for Patent claims priority to Greek Patent Application No. 20130100618 entitled "Improvement of Dihedrals of Stealth Aircraft for Velocity" filed Oct. 25, 2013, hereby expressly incorporated by reference herein.

BACKGROUND

Field

The present invention relates to techniques for improving the aerodynamic profile of crafts with multi-faceted dihedral angle planform design, and in particular, for improving crafts with flat surfaces for low observability using insufflation.

Background

Stealth craft design tends to adhere to fundamental shaping principles. For example, the Lockheed F-22 aircraft is shaped with leading and trailing edges of the wing and tail having identical sweep angles (a design technique called planform alignment). The fuselage and canopy have sloping sides. The canopy seam, bay doors, and other surface interfaces are saw-toothed. The vertical tails are canted. The engine face is deeply hidden by a serpentine inlet duct and weapons are carried internally.

Despite the benefits of shape design to achieve low observability to scanners, such as radar (or sonar, depending on the craft), there are often additional factors that can enhance observability. These include engines, fuel, avionics packages, electrical and hydraulic circuits, and people.

Radar absorbing materials, in the case of stealth craft, serve to reduce an aircraft radar cross section (RCS) against specific threats, and to isolate multiple antennas on the aircraft to prevent cross talk.

There are two basic approaches to passive RDS reduction: (i) shaping to minimize backscatter, and (ii) coating for energy absorption and cancellation. Both of these approaches have to be used coherently in aircraft design to achieve the required low observable levels over the appropriate frequency range in the electromagnetic spectrum.

There is a tremendous advantage to positioning surfaces so that the radar wave strikes them at close to tangential angles and far from right angles to edges. To a first approximation, when the diameter of a sphere is significantly larger than the radar wavelength, its radar cross section is equal to its geometric frontal area. The return of a one-square-meter sphere is compared to that from a one-meter-square plate at different look angles. One case to consider is a rotation of the plate from normal incidence to a shallow angle, with the radar beam at right angles to a pair of edges. The other is with the radar beam at 45 degrees to the edges. The frequency is selected so that the wavelength is about 1/10 of the length of the plate, in this case very typical of acquisition radars on surface to air missile systems. At normal incidence, the flat plate acts like a mirror, and its return is 30 decibels (dB) above (or 1,000 times) the return from the sphere. If we now rotate the plate about one edge so that the edge is always normal to the incoming wave, we find that the cross section drops by a factor of 1,000, equal to that of the sphere, when the look angle reaches 30 degrees off normal to the plate. As the angle is increased, the locus of maxima falls by about another factor of 50, for a total change of 50,000 from the normal look angle. Now if you go back to the normal incidence case and rotate the plate about a diagonal relative to the incoming wave, there is a remarkable difference. In this case, the cross section drops by 30 dB when the plate is only eight degrees off normal, and drops another 40 dB by the time the plate is at a shallow angle to the incoming radar beam. This is a total change in radar cross section of 10,000,000!

From this, it would seem that it is fairly easy to decrease the radar cross section substantially by merely avoiding obviously high-return shapes and attitude angles.

Shaping requirements have strong negative influence on an aircraft's aerodynamic properties. For this reason, an aircraft such as the F-117 has poor aerodynamics, is inherently unstable, and cannot be flown without computer assistance.

Also, shaping does not offer stealth advantages against low-frequency radar. If the radar wavelength is roughly twice the size of the target, a half-wave resonance effect can still generate a significant return. However, low-frequency radar is limited by lack of available frequencies which are heavily used by other systems, lack of accuracy given the long wavelength, and by the radar's size, making it difficult to transport.

Acoustic stealth plays a primary role in submarine stealth as well as for ground vehicles, but also in aircraft.

In addition to reducing infrared and acoustic emissions, a stealth vehicle must avoid radiating any other detectable energy, such as from onboard radars, communications systems, or RF leakage from electronics enclosures.

The size of a target's image on radar is measured by the radar cross section. Modern stealth aircraft are said to have an RCS comparable with small birds or large insects, though this varies widely depending on aircraft and radar. Because RCS is directly related to a target's cross-sectional area, the only way to reduce it is to make the physical profile smaller. When reflecting much of the radiation away or absorbing it altogether, a stealth object achieves a smaller radar cross section.

To reflect radiation without the use of high-return shapes and attitude angles, dihedral angle planform design may be utilized. Unfortunately, sharp dihedral-edge design has not been consistently implemented, most importantly due to poor aerodynamics associated with sharp dihedral angles.

Half-true dihedrals have been adopted that achieve stealth benefits and at same time address the need to shape the craft to accommodate people and components, such as on-board equipment and fuel. Half-true dihedrals are characterized by slightly rounded dihedral- edge areas which help to reduce cavitation (e.g., wear, resistance to air, and/or fuel consumption) and/or air ionization (trailability).

Half-true dihedrals tradeoff better aerodynamics and the need to accommodate people and equipment for lower observability (better stealth capability).

It is desirable to be able to provide an improved stealth design configuration which addresses the problems of conventional systems.

SUMMARY

The present disclosure is directed to an improved stealth craft design. In accordance with an exemplary embodiment, a stealth craft's aerodynamics and flight stability are improved with the use of a multi-faceted dihedral planform. The stealth craft includes a multi-faceted dihedral planform extending in a direction from a front to a rear of a craft (or wing) and defined by a first set of facets followed by a second set of facets. In an exemplary embodiment, the first and second sets of facets have an angle of incline that is ascending and descending, respectively, with respect to the direction of the planform. Selected ones of the first and second sets of facets are configured with insufflation slots for improving aerodynamics and stability, the insufflation slots extending spanwise in a direction transverse to the direction of the planform and provided to insufflate a fluid to form a cushion of air along the multi-faceted dihedral planform for improving aerodynamics and stability.

Recovery slots are also provided that recover insufflated fluid. The recovery slots are adapted coupled to a mechanism for recirculating the recovered insufflated fluid and re-insufflating it downstream of the multi-faceted dihedral planform. In one scenario, the multi-faceted planform is a wing, and the at least two substantially flat surfaces associated with the first set of successively ordered dihedrals is the front portion of the wing.

In a further scenario, the insufflated fluid is incident air collected through outside air collection vanes. In a related scenario, the collected incident air is used to generate insufflated air and to expel it in a way to achieve a desired pressure distribution of the cushion of air.

In another scenario, a recovery shield is employed to block at least a portion of the air cushion from traveling beyond a recovery region.

In yet another embodiment, a blower mechanism is employed to generate insufflated air in a manner aimed to achieve a desired pressure distribution of the cushion of air.

The insufflation slots/points and the recovery slots are coupled via piping that channels air to/from associated surfaces. The piping channels pump/expel air at a speed and volume selected automatically by an on-board computer in response to at least one of speed, acceleration, weather and wind conditions.

The stealth craft may be either a marine craft. The expelled insufflated fluid in this case may be either or both air and water.

Alternatively, the stealth craft is a stealth aircraft and the fluid is air or any suitable fluid capable of generating the desired aerodynamic air of cushion. In one scenario, the In a further exemplary embodiment, the entire aircraft has a multi-faceted dihedral planform including the flight deck window and the wings. With respect to the flight deck window portion of the aircraft, the multi-faceted dihedral planform extends from the front tip of the stealth aircraft to the rearmost portion thereof.

In yet a further embodiment, the aircraft includes at least one fin which fin also has a multi-faceted dihedral planform and may include insufflation slots and points for creating an appropriate aerodynamic air cushion between the surface thereof and incident air.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIG. 21 shows a two plane dihedral.

FIG. 22 shows a multi-faceted, multi-dihedral alternative to the dihedral shown in FIG. 21.

FIG. 23 shows two resulting receding dihedrals: case of unequal ones.

FIG. 24 shows two resulting bulging dihedrals: case of equal ones.

FIG. 32 is a diagram showing a virtual air front (wing aerodynamics).

FIG. 33 is a diagram showing a virtual air front (leading edge aerodynamics).

FIG. 34 is a diagram showing a flap of variable geometry.

DETAILED DESCRIPTION

Figure 1:
FIG. 1 is a side perspective view of dihedral surfaces.
Figure 2:
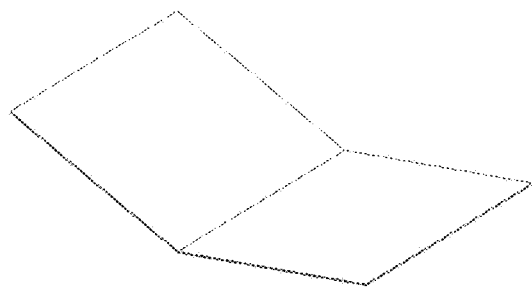
FIG. 2 is a 3D rotated view of the dihedral surfaces in FIG. 1.
Figure 3:
FIG. 3 is a side perspective view of the dihedral surfaces shown in FIG. except the larger two plane surfaces are show "interpolated" meaning multiple flat surfaces are joined together to form multiple dihedrals.
Figure 4:
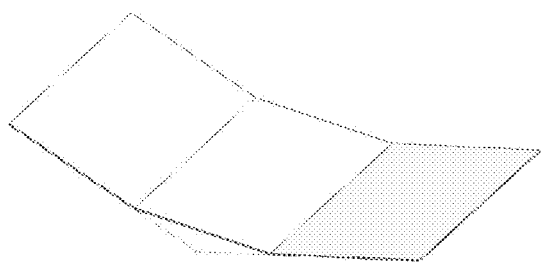
FIG. 4 is a 3D rotated view of FIG. 3.
Figure 5:
FIG. 5 is a cross-sectional view of a wing of a conventional stealth aircraft.
Figure 6:
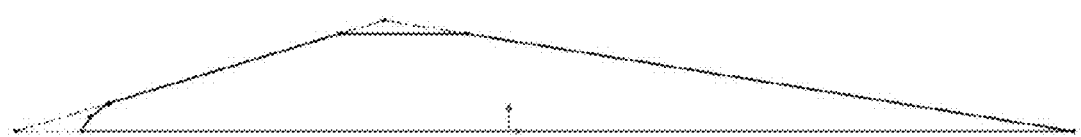
FIG. 6 shows the wing of FIG. 5, in accordance with an exemplary embodiment. The front and mid-section flat surface dihedrals have been replaced with two multi-faceted dihedrals.
Figure 7:
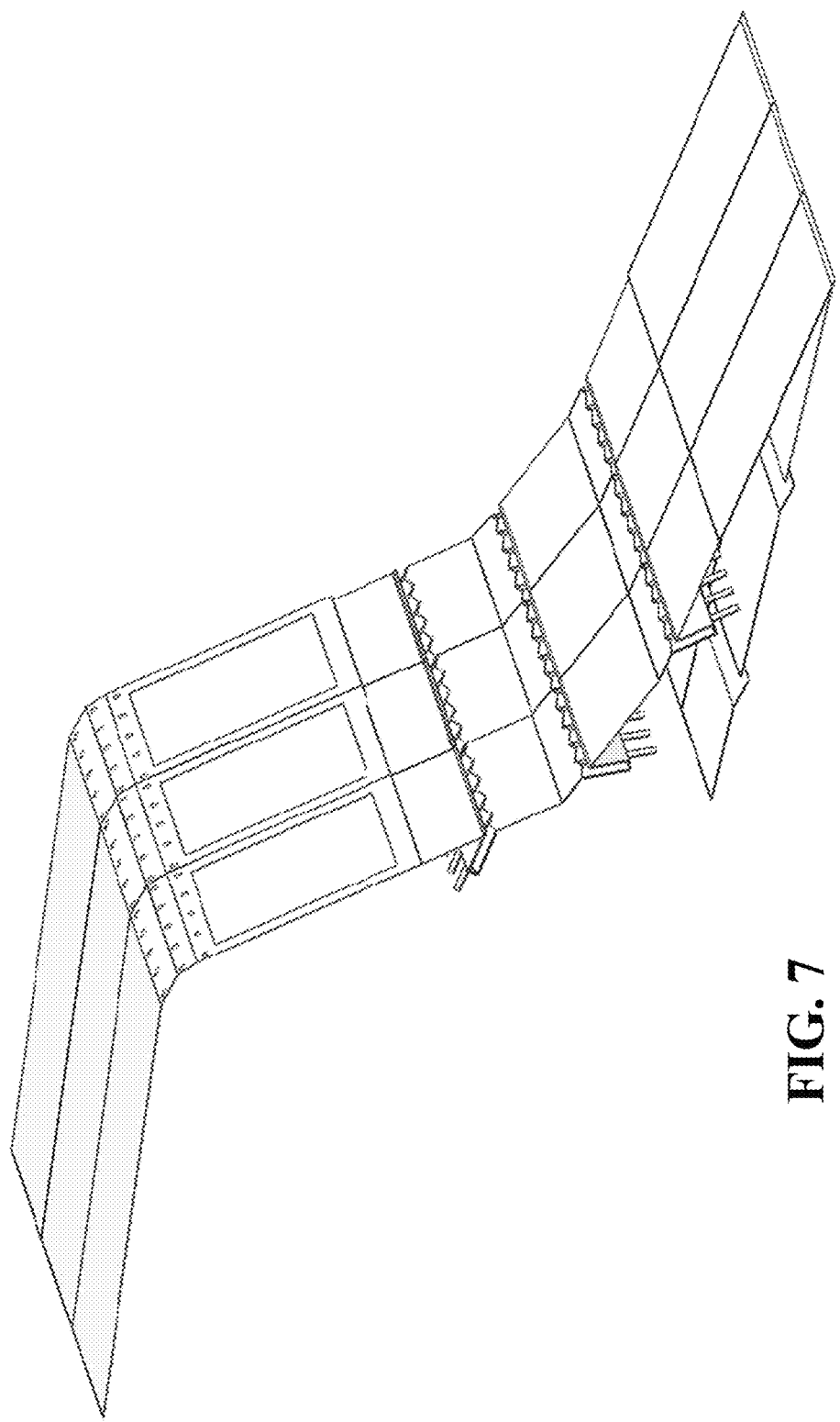
FIG. 7 shows a front to mid-section of a concept stealth aircraft in accordance with an exemplary embodiment in 3D. As shown, the long flat surfaces of a conventional stealth device are replaced with multiple facets (flat surfaces) that define multiple dihedrals moving from the front to the back. The holes represent insufflation, collection, and recovery slots of expelled fluids.
Figure 8:
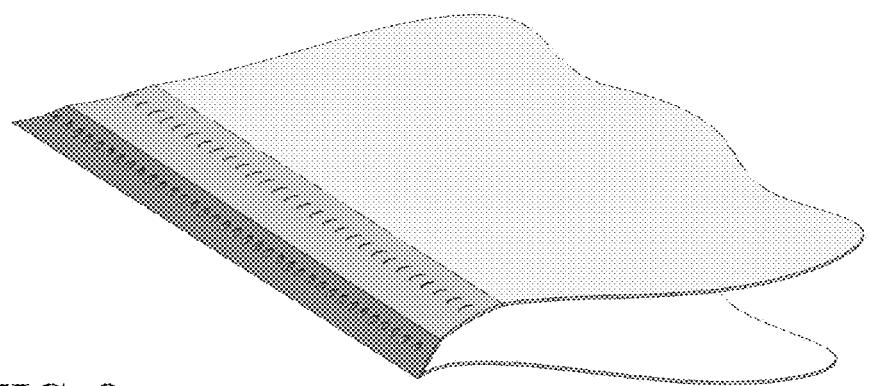
FIG. 8 is a 3D perspective of a partial front of wing of a stealth aircraft. The holes show conceptually the arrangement of insufflation and other slots as proposed herein.
Figure 9:
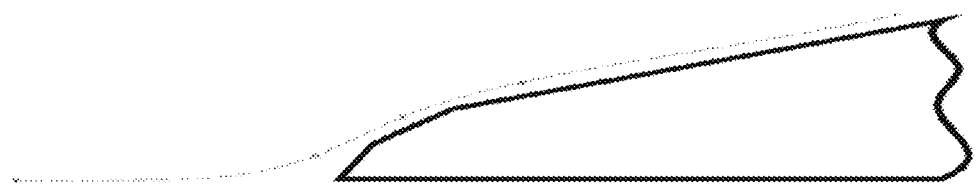
FIG. 9 is a cross-length sliced sideview perspective of the partial front wing in FIG. 8.
Figure 10:
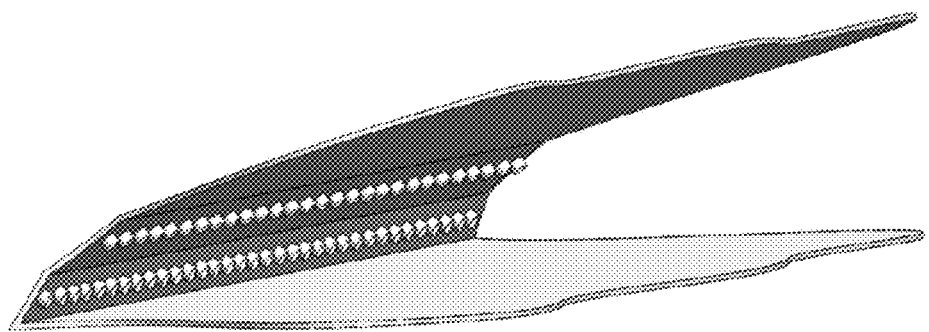
FIG. 10 is a 3D inside out view of the partial front wing perspective of FIGS. 8 and 9.
Figure 11:
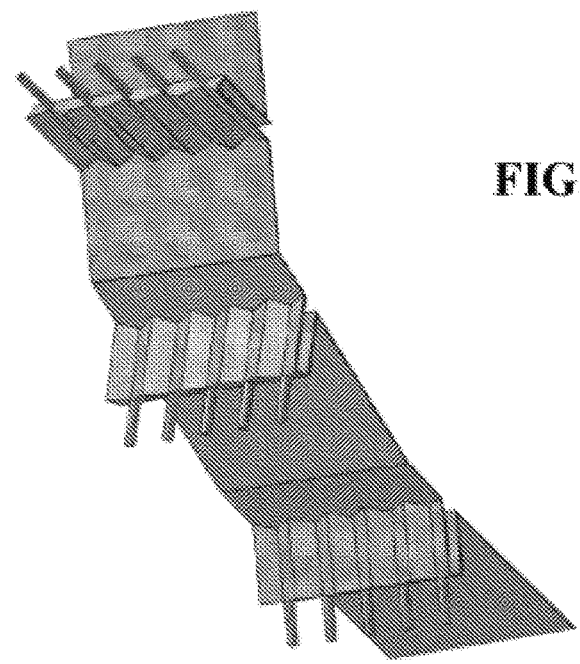
FIGS. 11 to 15 are different perspectives of a partial front to back traversing portion of a stealth aircraft. The present view shows the dual concepts of the present invention of providing insufflation through strategically positioned slots aimed to create a cushion of air at points along a planform of an aircraft or marine vehicle which is most susceptible to turbulence due to otherwise steep surface dihedral design.
Figure 12:
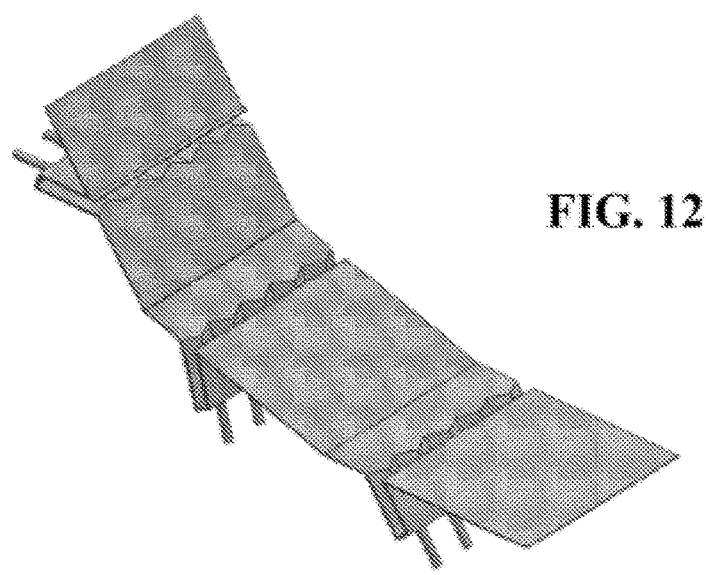
Figure 13:
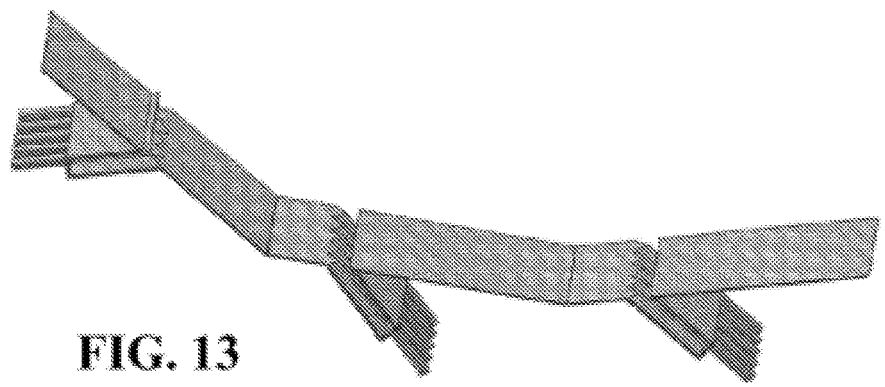
Figure 14:
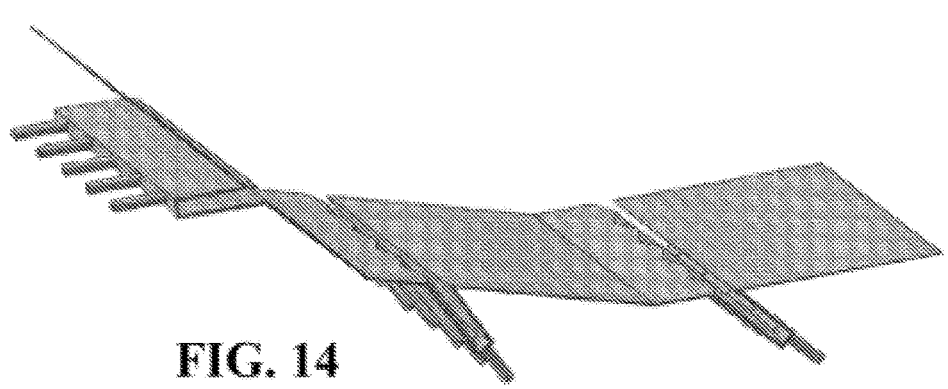
Figure 15:
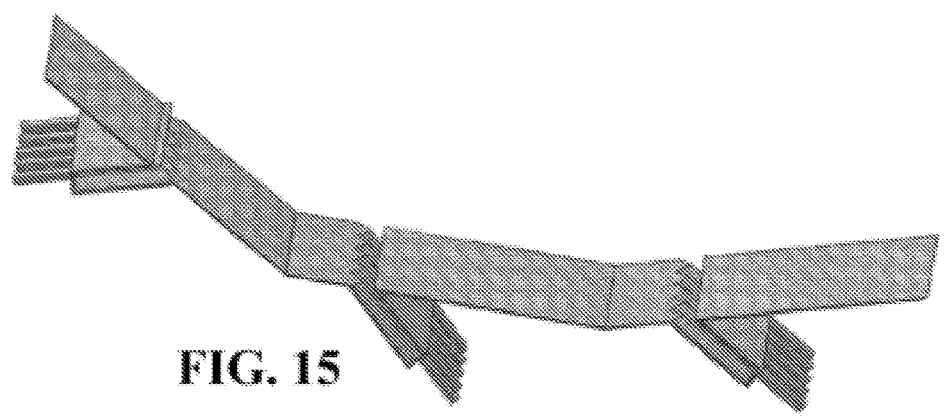
Figure 16A:
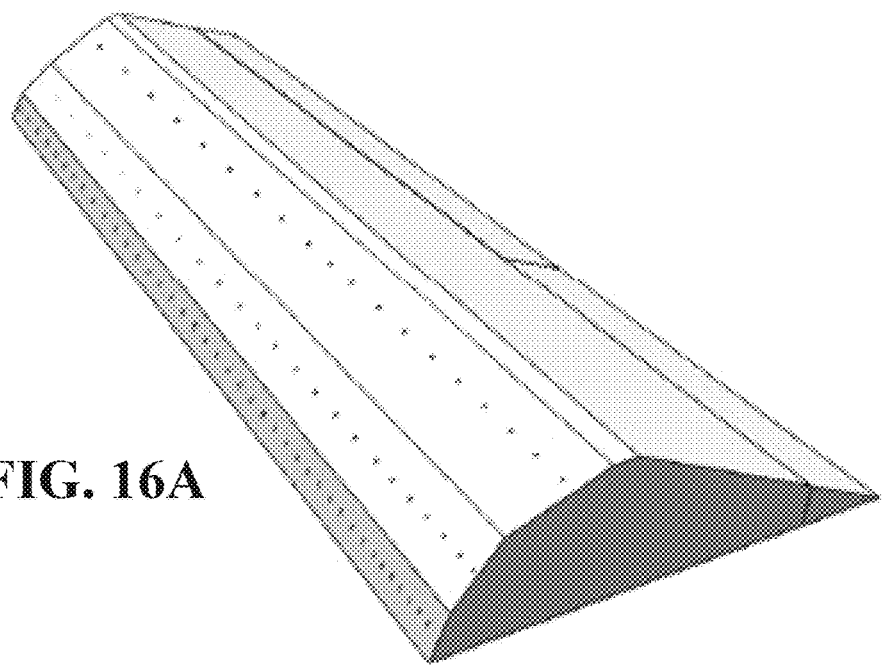
FIGS. 16A and 16B show different perspectives of a full wing configuration as proposed herein provided with strategic slots throughout a front to back planform to result in an insufflated multi-faceted dihedral planform as defined here and throughout this application.
Figure 16B:
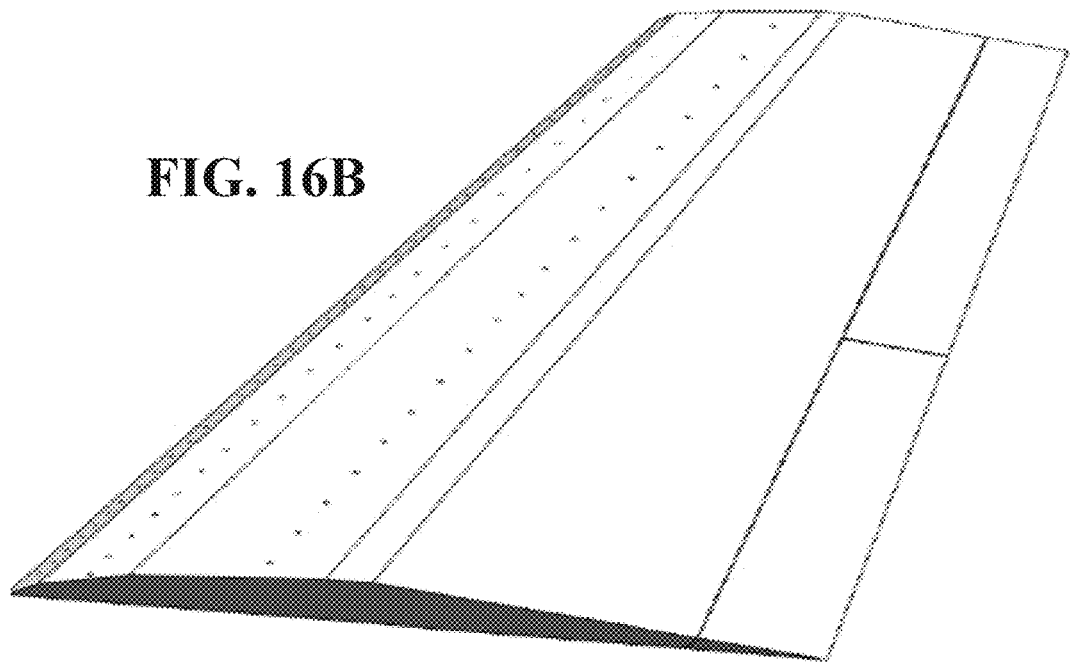
Figure 17:
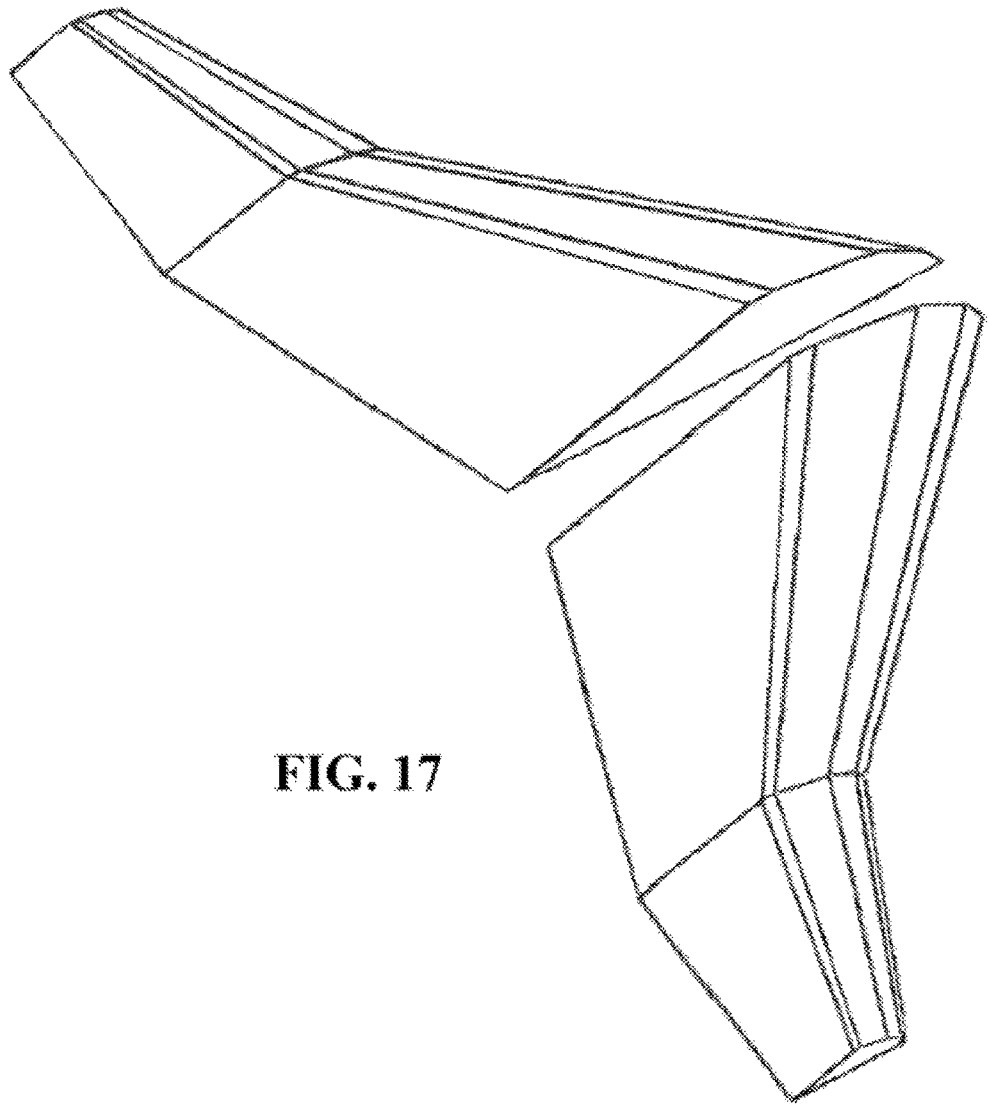
FIG. 17 shows a two-wing configuration similar to that shown in FIG. 16A and 16B, except both wings breaks toward the rear. Each partial section of the wing in FIG. 16A, for example, has its own multi-faceted dihedral planform to improve efficiency.
Figure 18:
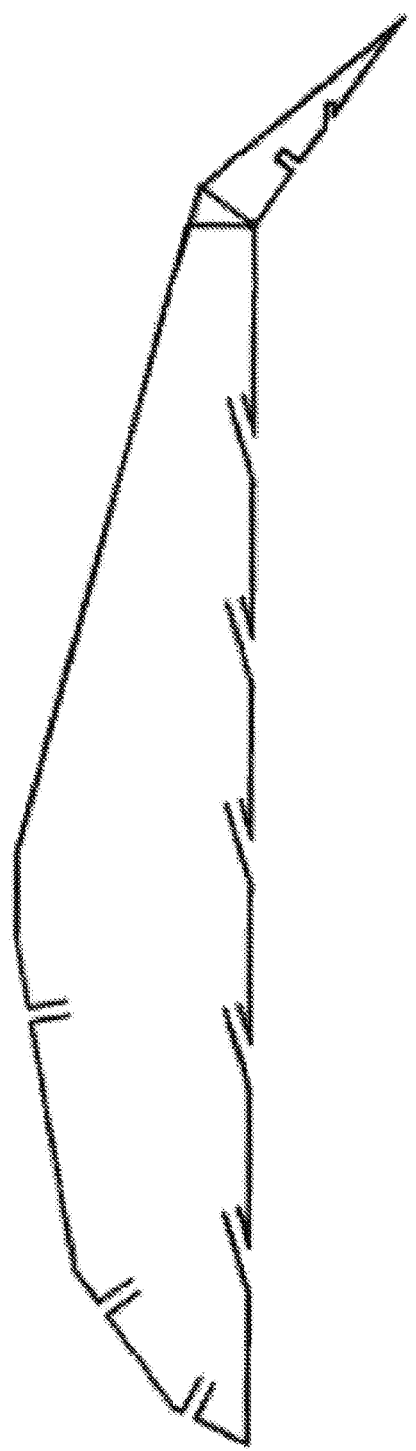
FIG. 18 shows a unique wing configuration complete with insufflation slots disposed on both the fixed wing and on a swiveling fin/aileron component. In addition, a retracting telescoping-like element is attached to a hinge point and causes itself to open to help reduce excessive turbulence.
Figure 19:
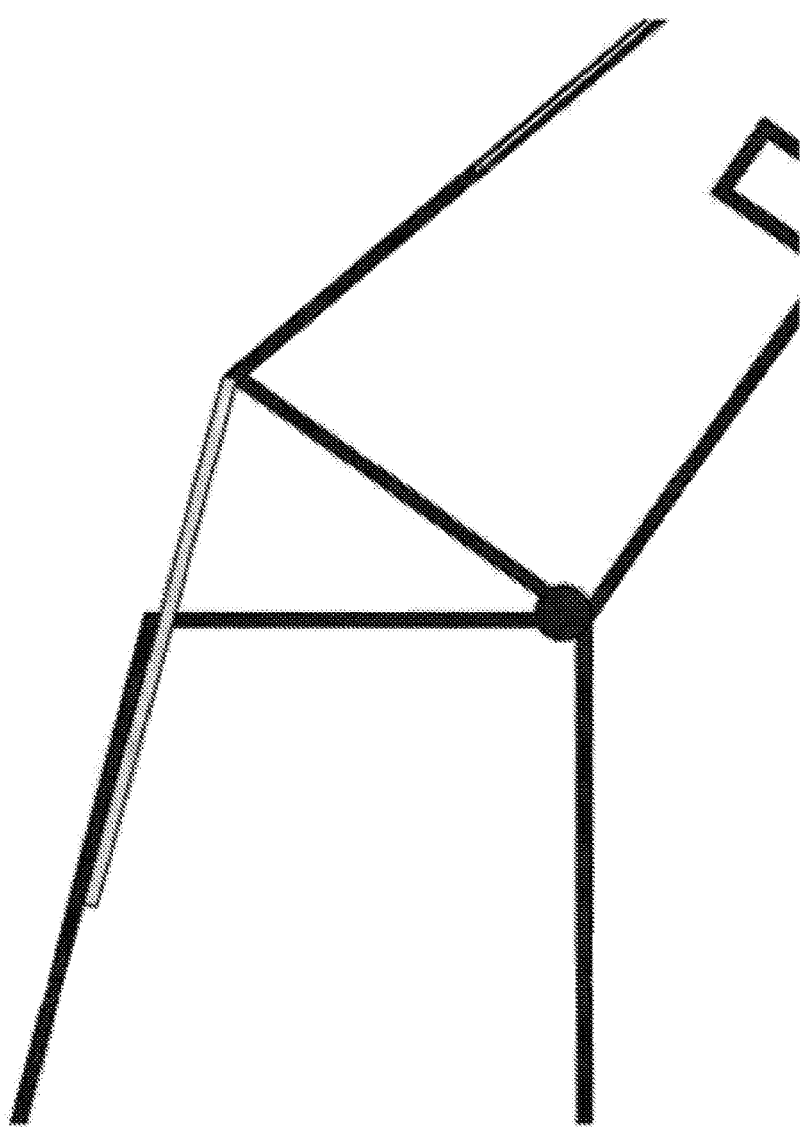
FIG. 19 is a blown up view of the circled portion in FIG. 18.
Figure 20A:
FIGS. 20A to 20J show various alternative design scenarios that could easily be implemented on stealth craft to improve function and speed.
Figure 20B:
Figure 20C:
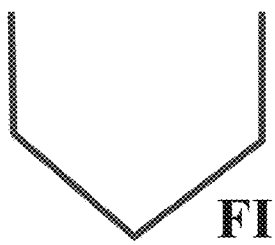
Figure 20D:
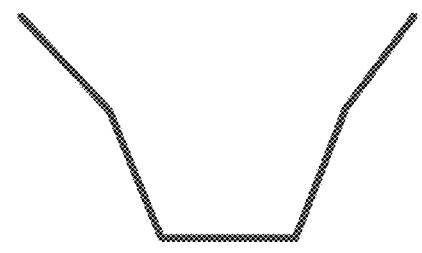
Figure 20E:
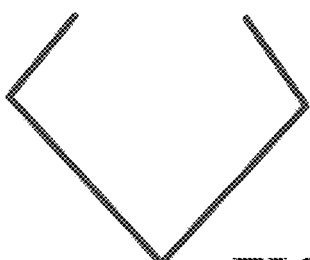
Figure 20F:
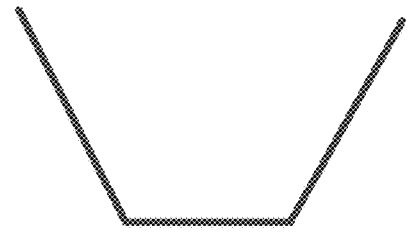
Figure 20G:
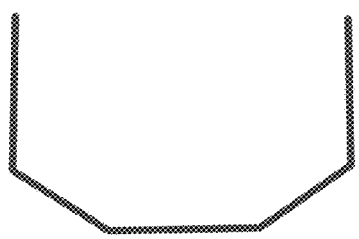
Figure 20H:
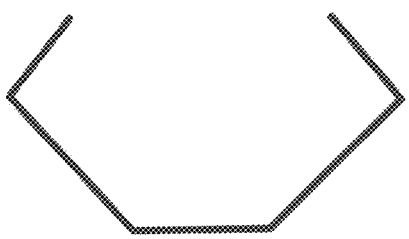
Figure 20I:
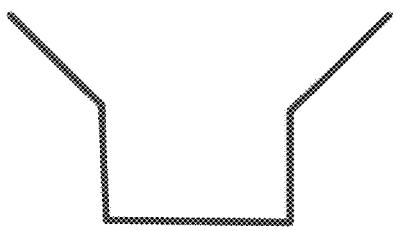
Figure 20J:
Figure 25:
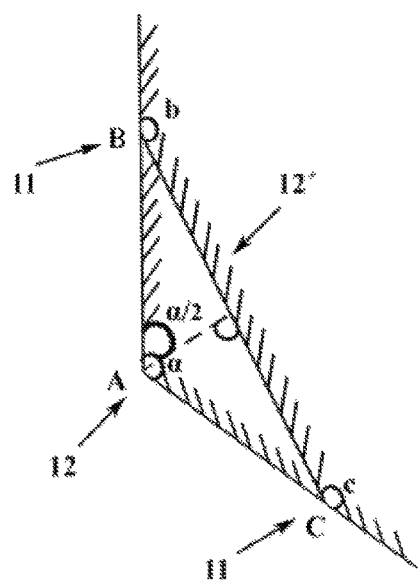
FIG. 25 shows two resulting bulging dihedrals: case of unequal ones.
Figure 26:
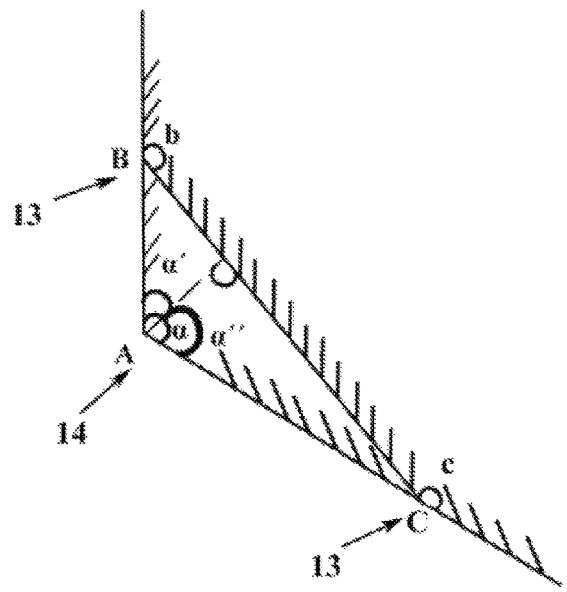
FIG. 26 shows air insufflation (perspective).
Figure 27:
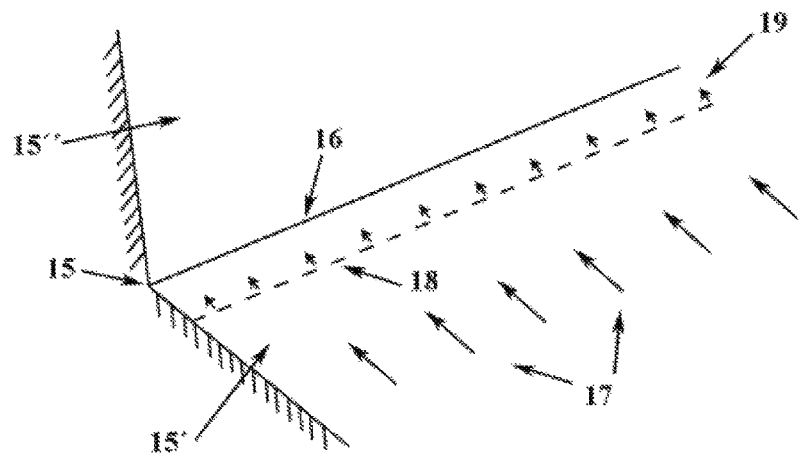
FIG. 27 shows air insufflation slot (perspective).
Figure 28:
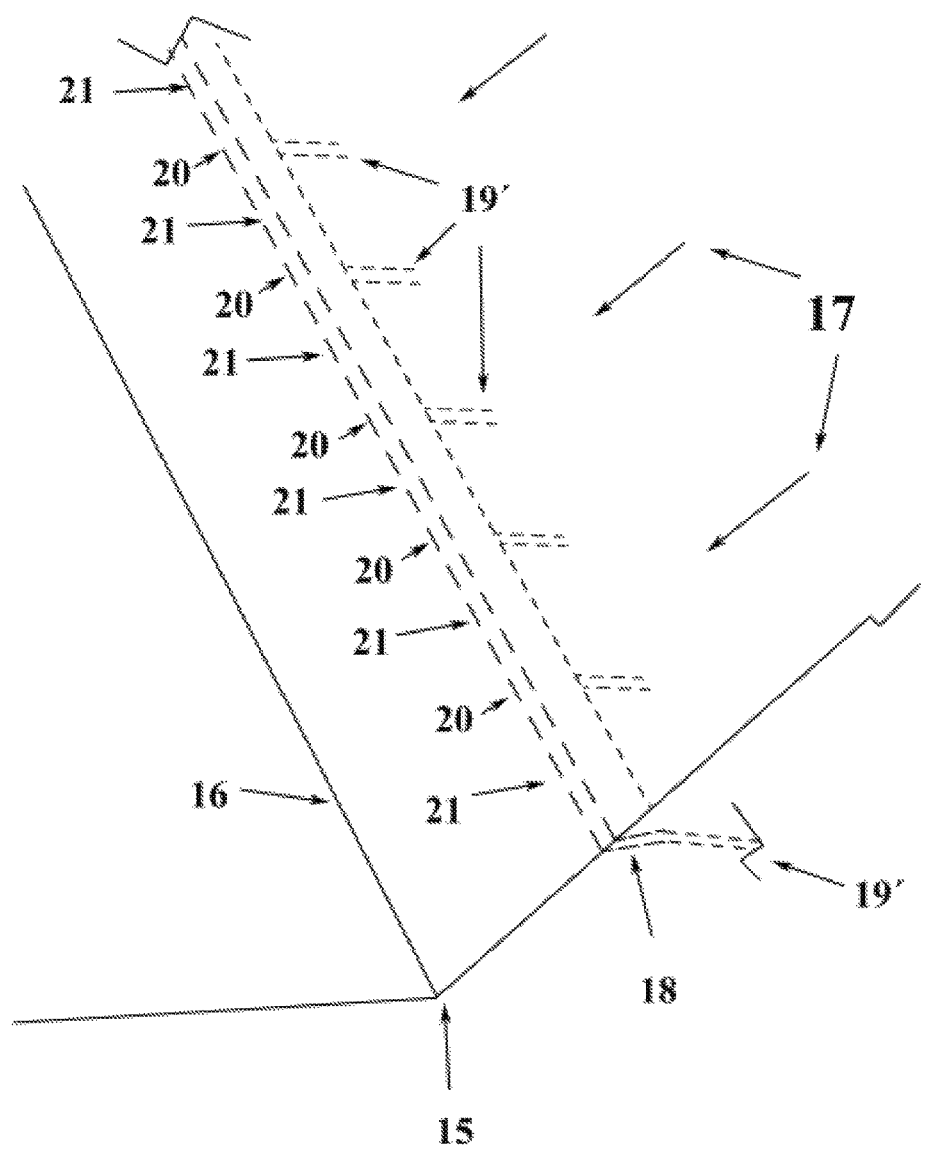
FIG. 28 shows insufflation and recovery of air (perspective).
Figure 29:
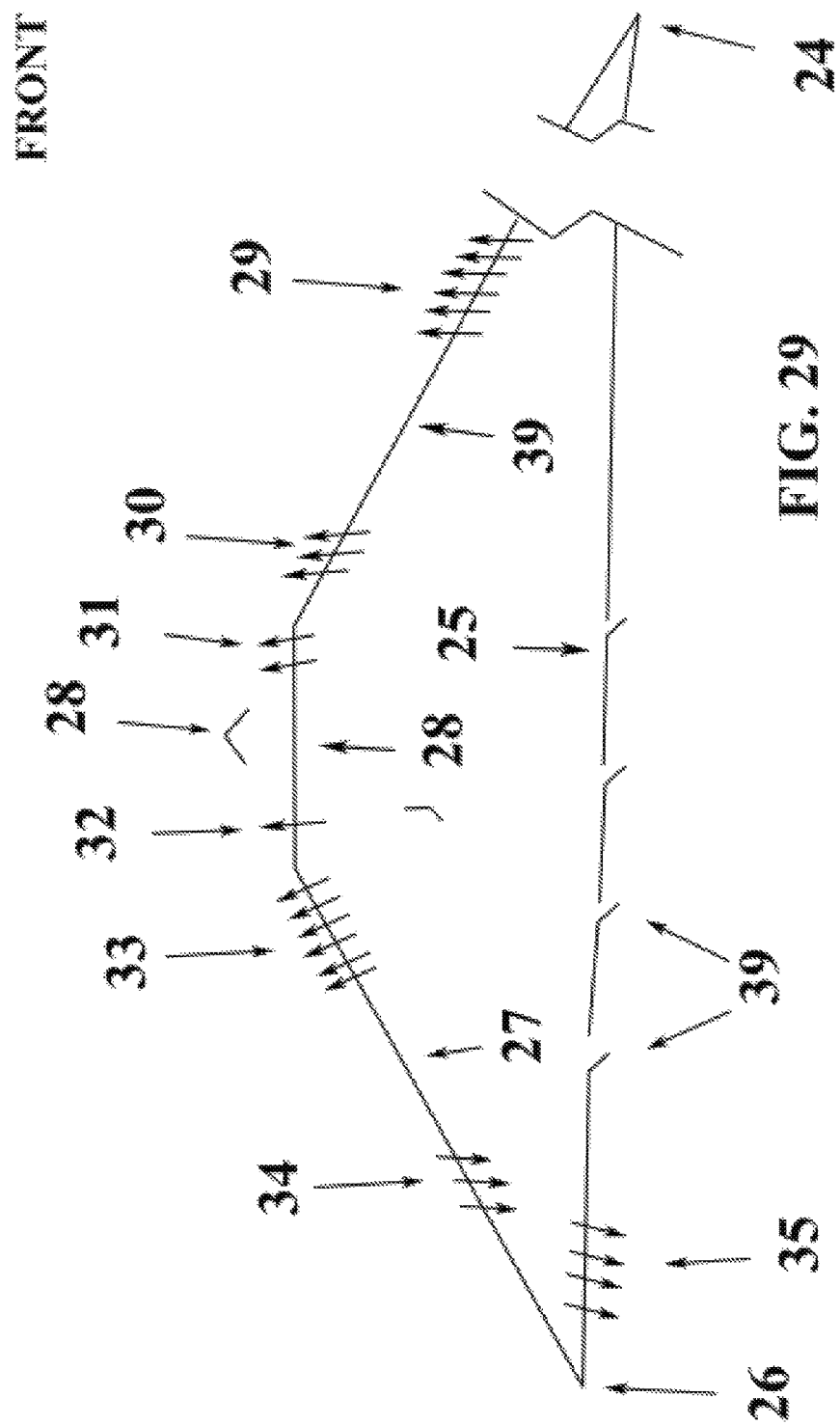
FIG. 29 shows a section of a wing: insufflation point.
Figure 30:
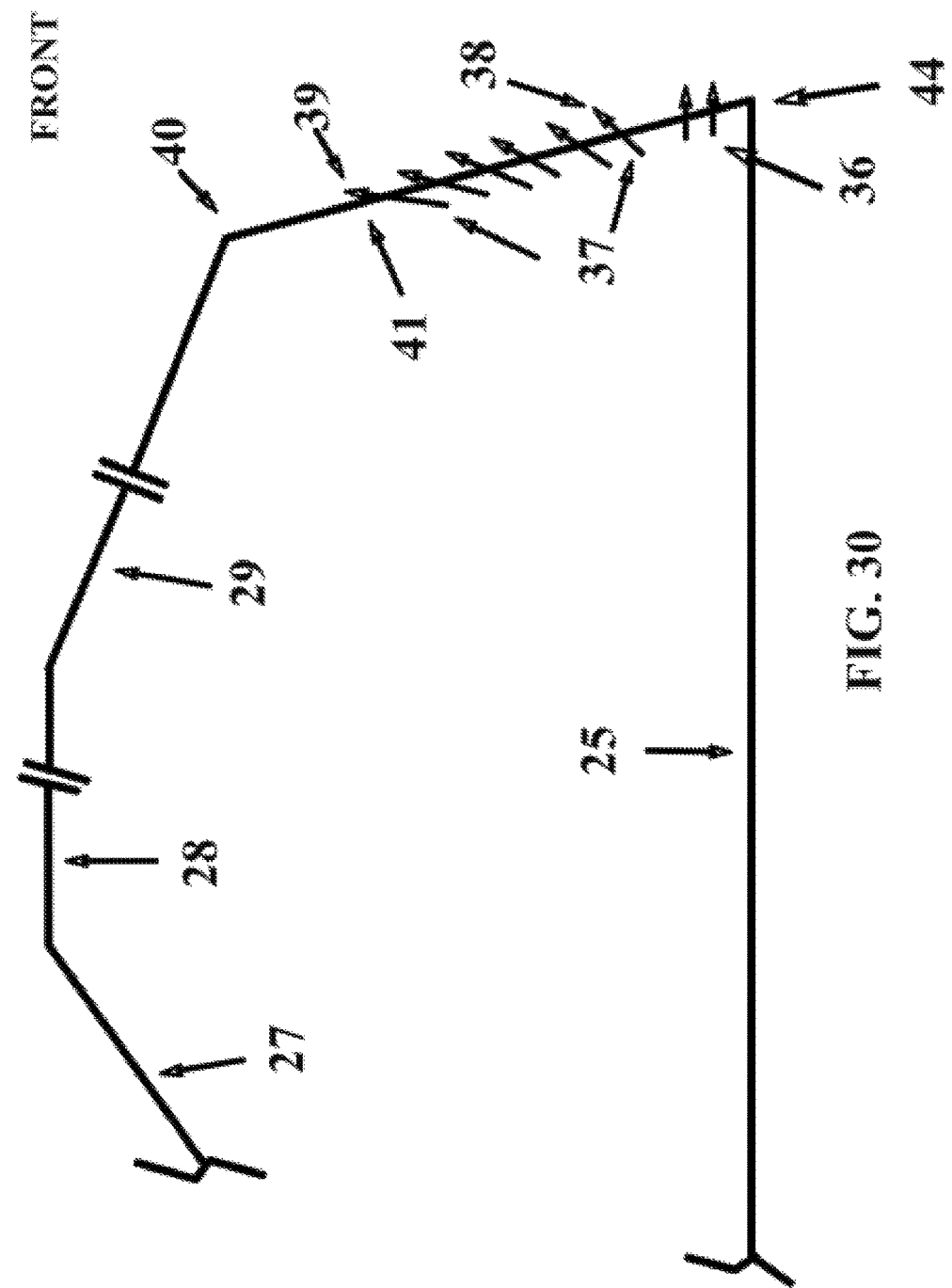
FIG. 30 shows a section of a wing's leading edge with one interpolated facet.
Figure 31:
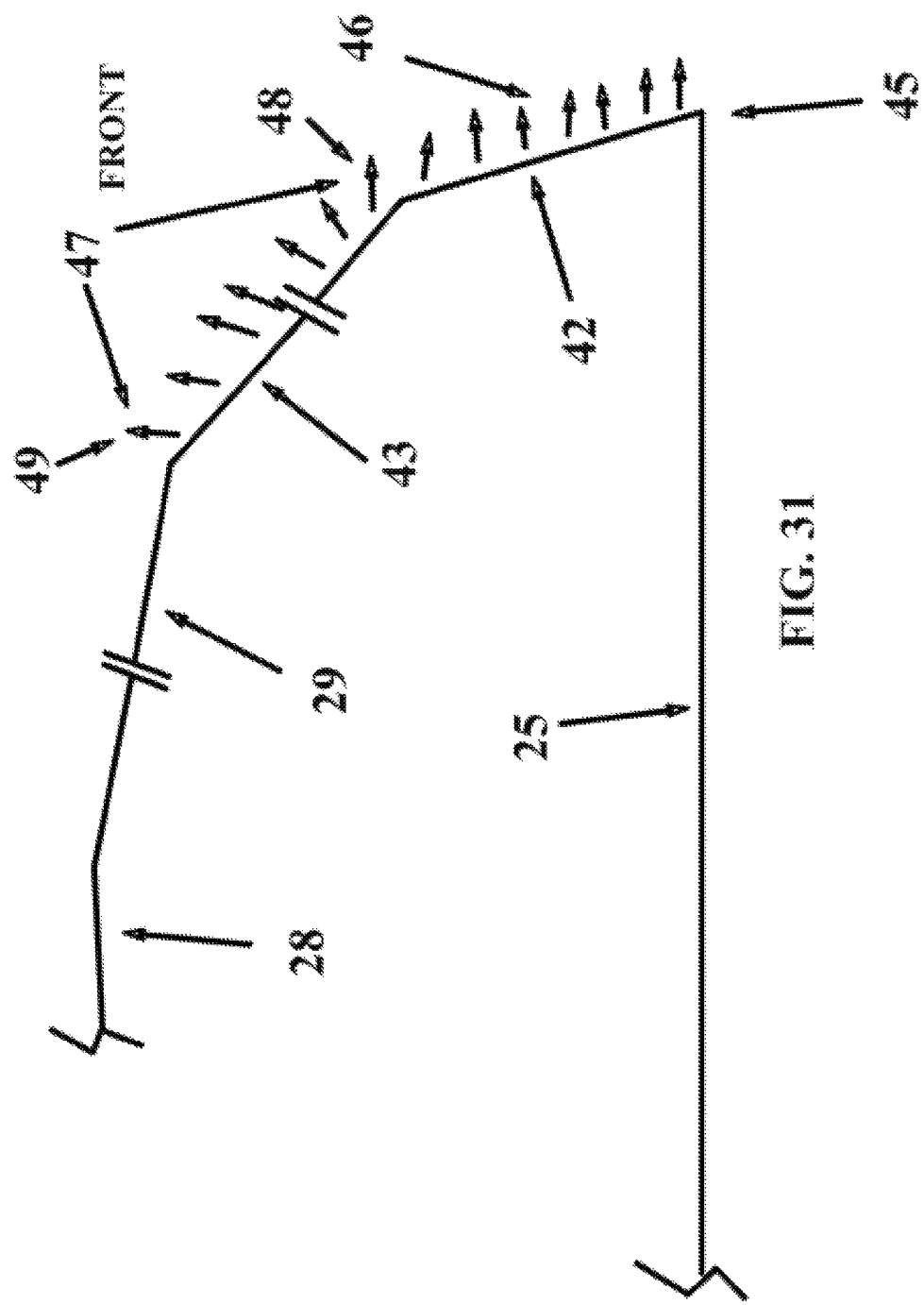
FIG. 31 shows a section of wing's leading edge with 2 interpolated facets.

The word "exemplary" is used herein to mean "serving as an example, instance, or illustration." Any embodiment described herein as "exemplary" is not necessarily to be construed as preferred or advantageous over other embodiments.

The following description is intended to convey a thorough understanding of the embodiments described by providing a number of specific embodiments and details involving methods and systems for managing content submission and publication of content. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

A good stealth aircraft design must provide low observability and good aerodynamic efficiency. Significant undesirable air resistance—which increases exponentially with increasing velocity—directly hinders a craft's agility and makes flying at high speeds prohibitive. Likewise, the need for stealth craft to be able to carry a load, equipment, and/or people also restricts the ability of creating optimum stealth geometries. An inefficient shape geometry contributes to the problem of higher fuel consumption, propensity to spin and or stall during certain maneuvers or wind conditions, and similar problems. These problems often make it necessary for certain military missions to be undertaken at night.

The present disclosure is directed to improvements in the design of vehicles and crafts or all kinds where there is a desire to achieve low observability to scanners, such as sonar and radar.

More specifically, the present disclosure describes various novel shape geometries and accompanying mechanisms and techniques that aim to address the challenges and problems of conventional stealth designs. The proposed approaches overcome the problems associated with high air resistance, allow for greater agility even at high velocities, without the need for high fuel consumption, high wear and/or significant air ionization.

The proposed approaches and techniques may be employed and adopted for use on aircraft, helicopters, drones and ballistics; as well as marine vehicles and craft where necessary or desirable to reduce observability to scanners such as sonar, for example.

In accordance with a first exemplary embodiment, a new multi-faceted dihedral-angle-based planform is provided. The new multi-faceted dihedral-angle-based planform has a geometry characterized by interpolating one or more parallel intermediate flat narrow facets in an area previously defined by a single dihedral angle.

The introduction of multiple interpolated facets as proposed replaces a single sharp angle of a single dihedral and at same time eliminates the need for making "curved" either of the surfaces about the edge defined by the single dihedral.

The present approach can be employed to improve (reduce) observability of (i) an aircraft flight deck profile and roof; (ii) a wing leading edge, upper surface and/or underside; and (iii) anywhere else on a craft where it possible to provide a variable shape geometry.

The present approach also can find use on non-stealth craft in order to make them stealth. Such craft include traditional aircraft, vintage aircraft, unmanned aerial vehicles (drones), ballistics, experimental craft, helicopters, autogiros, gliders, and the like.

In addition, the present approach can find use in any component, appendage and/or accessory that requires it to have a stealth configuration, including prismatic or pyramidal shaped components, and components that have primarily bulging type dihedrals, but also receding type dihedrals. Examples of such components include:

(i) the contour of a fuselage, the motors and hatchways of a craft;

(ii) the nose and (jet) motor cowlings;

(iii) wing elements beyond and beneath the craft surface, including elements such as frontal parts (slats, ailerons, flaps, ribs, stringers, wing tip fins, etc.);

(iv) canards, rudder and tail-plane elements; upper roundels, helicopters superstructure, lower racks, floats, underwing canisters;

(v) (non-retracting) wheel legs and other struts, and various other rigging.

In order to improve the aerodynamics of the multi-faceted dihedral-angle-based planform described above, in accordance with a further embodiment, the craft is configured to blow (insufflate) a fluid (normally ambient or compressed air) into the path of the air stream traveling over the surface of the multi-faceted dihedral-angle-based planform.

The introduction of blown air is particularly effective along edges of dihedrals as well as at breaking points such as where three or more edges come together. The multi-faceted dihedral-angle-based planform is part of the design of a craft and thus permanent in nature. The additional mechanism of providing blown air requires limited customizability, and is in this regard also permanent. However, as to the latter, it is possible to disable the functionality that is associated with the blowing of the air, or to configure its use under some circumstances (flight objectives, weather conditions, etc.) but not others.

By designing a wing or other surface to have a multi-faceted dihedral-angle-based planform, and at same time, providing blown air to that surface, it is possible to lower air resistance to power ratio, increase speed, achieve better agility, reduce fuel consumption, minimize material wear caused by friction with air and cavitation, achieve improved stealth ability, and to some extent eliminate the need for more complex and costly alternative stealth measures.

Definitions

For purposes of the present application, a dihedral is the angle between two sides of a metallic material of an craft, e.g. the angle containing an aircraft's solid mass, while on the other face of the combination of these two sides there is the corresponding angle (its bi-angle) containing air (otherwise, empty space); the sum of a dihedral and its bi-angle, measured in degrees, is 360°.

A dihedral is defined as a shape having two plane facets (2-dimensional) and one edge (one-dimensional) at an intersection between the two plane facets, i.e. the straight line at which the two plane facets meet. Insufflation of air is effected (and is implemental for the job) at points disposed parallel and upstream of each and every receding edge, and both upstream and downstream of each and every bulging edge, from which (edge) a plane can be drawn being perpendicular to the aircraft's horizontal plane and not parallel to the longitudinal axis. A horizontal plane of an aircraft is the plane perpendicular to the aircraft's vertical axis when the craft is on the ground and it comprises roughly the wingspan (and the whole of the aircraft's lower side) and the fuselage or whatever of it is included in the flying wing configuration. The notion of upstream (15') applies to areas/places which meet incoming air (17) before the edge (16) does so; on the contrary, downstream (15") areas/places meet incoming air after the edge does.

On the leading and on the trailing edge of the wing, areas of its corresponding leading and trailing dihedrals, the facet situated at the upper side is the up-facet of the corresponding dihedral (ascending for the leading dihedral, descending for the trailing one), and the lower, horizontal one is the low-facet (the front and the rear part of the flat lower side of the wing respectively)

In case a dihedral's edge lies in a vertical plane parallel to the longitudinal axis of the aircraft, where the notions fore and aft don't apply, the rising facet is again the up-facet and the other one is the low-facet.

On other dihedrals, the facet situated more to the front is the dihedral's fore-facet and the other one (the rather uprising one) is its aft-facet.

There are also fore-facets and aft-facets in the bulging longitudinal dihedral mid-wing (the up dihedral, whose edge is the up-edge), on the upper side of each one of the two half-wings on the left and on the right of the flight deck, in the direction of the longitudinal axis of the half-wing, on its transversally median line along this longitudinal axis; these fore- and aft-facets (the ascending and descending ones) coincide with the up-facet of the leading and the trailing dihedrals respectively.

The intersection of a dihedral with a plane drawn perpendicular to its edge (from any point of this edge) is its plane angle (the angle between the straight-line-intersections of its two facets with this plane), whose width is constant, whatever the edge's point the perpendicular plane is drawn from.

A dihedral is characterized by its dihedral angle, i.e. the angle between its two facets in degrees, which is equal to its plane angle; this plane angle is either wider than 180°, in which case the dihedral is known as receding, its bi-angle's plane angle being almost always an obtuse angle, almost never a right one, and never an acute one, or the plane angle is less than 180°, and the dihedral is known as a bulging one: its plane angle is acute in the case of both leading and trailing edge of the wing in the generally adopted flying wing configuration of current stealth airplanes (as well as in the potential configuration with slats/ailerons/flaps attached to the wing), and in the potential cases of rudders and tail planes at the rear, and canards in front; and is obtuse on other places of stealth airplanes and in general of other types of aircraft.

A potential wing tip, up-protruding, has a back and forth cross section with intensely acute leading and trailing dihedrals, a very obtuse mid-length internal dihedral, a flat external side parallel to the aircraft's longitudinal axis, and a wing-to-tip larger-than-right receding angle.

It is noted that the majority of a stealth aircraft's dihedrals are bulging: most are obtuse, only exceptions being leading and trailing edges, very acute; the rest, the few receding dihedrals, are situated at the foot of the windows of the flight deck on its contour, all of them obtuse as a rule; bulging dihedral angles are the evolution of traditional airplane circular or convex curvilinear contour which occurred once stealth design broke into aviation.

A similar designation rule stands for breaking points, each being the place of two lengthwise-successive edges changing direction: the breaking point is a receding one in case the form of the place is concave, and a bulging one if the form is convex. Also each one of the wing's edges (leading and trailing) is potentially configured with a breaking point, roughly at its mid-length, designated similarly to the above: receding if concave-form, or bulging if convex-form; these are connected with the up dihedral's breaking point through "upright" edges (ascending and descending), each being the breaking place of the up dihedral's one facet (ascending or descending) being broken lengthwise at roughly mid-length.

Creation of, or designing a broken such facet (ascending or descending) or both of them entails the creation of a breaking point of the up dihedral, also the creation of similarly one or both "upright" edges (ascending, descending), and the creation of (similarly) a breaking point of the leading or the trailing edge, or of both of them; the receding or bulging character is common to all potential three breaking points and two "upright" edges.

A dihedral is also characterized by its disposition in relation to the aircraft's longitudinal axis, i.e. conforming to the angle between the perpendicular plane to the aircraft's horizontal plane passing from the dihedral's edge, and the half-straight of the aircraft's longitudinal axis directed rearwards (roughly, the dihedral's edge-to-1.axis angle).

When the angle is acute (i.e., when the perpendicular plane meets the longitudinal axis in front of the aircraft), the dihedral is said to be "diverging"; that is, the plane diverges from the longitudinal axis when an observer's sight is directed rearward).

When the angle is obtuse (i.e., when the perpendicular plane meets the longitudinal axis towards the rear of the aircraft), the dihedral is then said to be converging; that is, the plane converges with the axis when an observer's sight is directed rearward.

Right angles between facets (adjacent or not) are to be avoided because incoming tracing beams reflect to the source (through double reflection). The same is true for 45° angles (triple reflection) and for parallel surfaces.

Introduction

The present disclosure is directed to a a dual scope refinement of aircraft: an aircraft efficiently stealth, capable of flying at really high velocities.

The efficiently-stealth notion ("stealth notion") is implemented through adopting flat surfaces forming geometric dihedrals and intersecting at sharp, straight edges; the high-velocities notion ("speed notion") is implemented through rendering said stealth-notion implementation aerodynamically efficient, by blowing ("insufflating") air at critical places of the aircraft, from inside outwards to converge with incoming air in a way to give a virtual (but effective) form to the front between the 2 converging volumes of air: a form copying an accredited wing-cross section of long standing.

The stealth notion is served through a system capable to really "make aircraft stealth", consisting of long, narrow flat surfaces (facets) to be applied on aeroplane surface at the place of, and replacing, existing (quite-)dihedral angles' edges: facets to be "interpolated" to each dihedral of a normal stealth design at the place of its edge; the system has absolutely sharp dihedral edges and absolutely plane facets, granting stealthiness to existing non-stealth aircraft and enhanced stealthiness to existing stealth ones.

One facet (1), 2 facets (4), or more, made from the material outer skin of stealth aircraft is made from, are interpolated at every edge and transform the single-dihedral (2, 5, 8, 12) stealth configuration into one with 2 dihedrals (3, 6), 3 dihedrals (6) or more, arranged in (practically) parallel succession.

Incoming air direction is thus smoother diverted (vs the single-dihedral situation) and air acceleration vector's diversion is better endured, thus causing a certain control of boundary layer separation and reduction of cavitation/material wear/resistance to air, and permitting considerably higher speeds while achieving absolute geometric stealthiness (such facets, replacing the outer skin of non-stealth aircraft, confer them stealthiness.

Several combinations of facet widths and dihedral angles are tried (or simulated) at every place of the aircraft in order to select one to best approximate an aerodynamically efficient cross section for that place.

Given a dihedral of V degrees, interpolation of one facet gives rise to 2 degrees, their sum being V+180°, and each time one more is added, the dihedrals (and edges) increase by one and their sum by 180°.

Successive dihedrals are at best unequal: when 2, the wider one is designed to meet incoming air first (upstream); if 3, the widest one first and the narrowest one comes second; these are the best sequences in air acceleration's diversion terms.

Research on substituting multi-dihedrals to single-dihedrals is particularly methodical for critical places like the flight deck area and the wing's leading edge and its upper side (while its lower side is flat). The speed notion is served through a method consisting in insufflating air under pressure (passive or active) on the facets of the foregoing system; following trials with variating air output and different geometric specifications of insufflation, eventually the best virtual air-to-air front curve (incoming-to-insufflated) aerodynamically is attained, precisely copying the most appropriate physical cross section for each part of the aircraft: turbulence, resistance and wear are minimized, permitting high speeds and agility while retaining stealthiness, thanks to air's being transparent to incoming tracing beams. The insufflation procedure consists of several elements: air acquisition (59) on the aircraft's surface in high-air pressure places; air insufflation proper (19), through slots (18) parallel to dihedrals' edges (16) and through short slots adjacent to breaking points (where 3 or 4 edges converge); air recovery through slots (22) and short slots helping save on acquisition and processing resources; re-insufflation of air recovered; final disposal of air, possibly re-processed, at low-pressure places, invisible to undesired parties; processing of air to optimize its quality of being untraceable; and a piping system with its mechanisms to channel air from place to place.

Geometric factors (slots, short slots, piping, and measuring/conveying/processing mechanisms) are fixed, while quantitative ones (air output rate and air processing ways) depend on conditions of flight and weather. Slots are designed to offer a low signature.

Research on virtual front curve is (also here) particularly methodical for critical places like the flight deck area and the wing's leading edge and its upper side. Prior to be insufflated onto aircraft's multi-dihedral angles, and prior to its own final disposal, the air is processed in a way optimizing its property to stay untraceable while urged outside the volume of the aircraft body: when crossing bulging dihedrals' edges. The air is conditioned in multiple steps to brave incoming tracing beams of various frequencies under various flight conditions, combinations (or sequences thereof) of both incoming and insufflated air conditions, and possible interactions with the external metallic (or other) skin's material and properties, and contrails. Pressure, enrichment with mist and various invisible agents (humidity, vapor etc.), (de)ionization, (ultra)sounds e.a. are candidate factors to be tried.

Specifically for the wing, complementing material and mechanisms are used for both stealthiness and lift force generation: facets interpolation to upgrade geometry and minimize radar signature, and insufflation action to enhance aerodynamics concur towards this double scope. Through gradually interpolating one facet (41), then 2 (42, 43) or more facets on the leading edge, it being initially around 15° (from the scarce information available on the issue), a gradual geometrical approach to a sound cross section creating most lift and least drag is achieved; by blending in insufflation, the resulting virtual air-to-air front curve approximates it even better, while importantly the flat facets retain their low signature.

Insufflation is effected on the leading edge's interpolated facets, its potential breaking point, and the equally potential upright dihedral edge connecting this point with the up-dihedral's breaking point in case this edge is not parallel to the craft's median longitudinal vertical plane; the front most facet is insufflated through a slots group formatted fan-wise, creating a smooth virtual angle-of-attack imitation; and the first front most slot being directed downward, causing the virtual curve's frontal part to imitate an accredited wing cross section's physical frontal part below the horizontal line of the wing's underside. In this underside there are acquisition slots (59), dispersed in the wing's transversal span, and insufflation slots (61) creating a small, virtual, flap-wise function of the underside's farthest back part.

A larger, physical, vertically revolving flap in the wing's rear part is created through installing an articulation (54) in the underside (allowing it to convert to a receding angle) and through providing for a moving transversal extension (52) of the wing's upper side at the rear part of the (descending) aft-facet of the wing's up-dihedral, the extension sliding telescopically under the fixed part (the frontal part) of this descending facet. The 2 flaps, virtual-insufflated (61) and larger-revolving one (50, 51), can work in synergy for attaining a controlled aerodynamic function of the wing in performing agility-demanding maneuvers. A mathematical method is useful in defining the form of a wing cross section starting from its desired aerodynamic properties.

Interpolation and insufflation, applied in synergy following this method, help (i) the virtual air-to-air front diagram be smooth to no less than second degree (a curve vs broken-rectilinear, and further a smooth curve vs a spasmodic hiccup-curved line), and (ii) the maximum pressure in absolute values (the negative pressure) in the leading edge area not exceed certain set limits in order to avoid cavitation and material wear while achieving the same amount of lift.

The method progresses in steps, by integrating to second degree a desired diagram of (negative) pressures reigning in the wing's upper side, thus to define a needed cross section diagram (a virtual air-to-air front section in reality), then researching the air-to-air front resulting from trials with various combinations of (fixed) facets interpolation and (changeable) air insufflation, to finally achieve the desired flight velocities range.

D Aircraft's dihedrals (articles 1 to 6)
1 Cases of successive dihedrals
1a A case of 2 successive dihedrals situated on one another occurs on an aeroplane at the flight deck's perimeter (i.e. the total of its inclined windows left, potential front, and right) and may occur at other places too;

1b in the case of the flight deck, there are 2 dihedrals' perimeters: upper and lower; each one of the upper perimeter's dihedrals is a bulging one, starting off with its fore-facet at the perimeter of the flight deck, i.e. either at its (potential) front or at one of its 2 sides, and leading with its aft-facet to the flight deck's roof, and each one of the lower perimeter's dihedrals is a receding one: it starts off with its fore-facet at the wing's upper side (either at its narrow portion situated in front of the flight deck, or at its 2 wider parts extending back, sideways of the flight deck) and leads with its aft-facet to one of the 3 parts of said perimeter which constitutes the sum of the fore-facets of the bulging dihedrals described (cf 2a. below).

This said, there are 3 possible such combinations of 2 successive dihedrals: one (potential) in front of the flight deck, and one on each side of it, left and right 1c Further on, in front of the flight deck, the successive-dihedrals combination potentially turns triple, detailing as follows: the bulging dihedral of the flying wing's leading edge (the leading dihedral), and the potential 2 frontal ones described above, the lower dihedral being a receding one, and the upper a bulging 1d There may be an upcoming aircraft version whose flight deck A. disposes a frontal window, and B. is positioned at the most advanced point in front of the entire flying wing; in such a case there is a frontal succession of 2 bulging dihedrals, one at the leading edge, the leading dihedral, locally being the pilot's foothold, and the other at the flight deck's roof as above described.

1e There is another typical case of a triple combination of successive dihedrals: the 3 bulging dihedrals front-to-rear on the wing's upper side (leading, up, and trailing), and this is dealt with in the following (M.1., N.1a. below).

2 Flight deck profile

2a On the upper surface of the fuselage (the aircraft's central part transversal-wise) there are 2 dihedral-edge perimeters, quite homocentric, their configuration being similar to the flight deck perimeter's one (cf 1b. above): the higher one is smaller: it is the broken line of successive bulging dihedrals' edges, and the lower one is wider in 2 dimensions, the broken line of receding dihedrals' edges; both of them delineate the flight deck's perimeter: the bulgings, at roof level; the recedings, at the perceived foot level, or rather at the specific height of the broken-line intersection of the leading dihedral's rising up-facet with the flight deck's front and sides.

2b Each point of meeting edges (that is, each breaking point) along each one of the 2 perimeters deserves attention concerning air insufflation; each one is a 3-edge meeting point, since a dihedral edge between the flight deck's (frontal and side) windows also converges (combinedly upwards-rearwards to one of its 2 tips, and downwards-forwards to its other tip) to such a point.

2c Leaving out the theoretically complete configuration, inclusive with frontal, diverging and converging dihedral edges in both perimeters of the flight deck, designated frontal—O configuration (cf 2g. below), in the now traditional flying-wing (and stealth) configuration of recent aircraft there exist neither frontal nor converging flight deck window and accordingly no dihedrals (receding or bulging ones);

there are instead only divergings: a window and (in the 2 perimeters) receding and bulging dihedrals on either side of the flight deck, meeting at the front nose of the flight deck, and disposed at an angle between the 2 sides which measures double their edges' angle to the longitudinal half-axis backwards (edge-to-1.axis angle, cf C.2g. above); this is the "V" configuration.

On each side (lift and right) the window and the 2 dihedrals ascend straight back and end at a point of the roof (the window tapering there, and the edges of the 2 dihedrals meeting/converging there);

there are 2 dihedrals and one breaking point all round in each one of the 2 perimeters (lower and higher), and they deserve attention concerning interpolation of facets for the dihedrals, and insufflation for all them;

there is also a frontal upright edge, inclined, connecting the breaking points of the 2 perimeters: there is neither need for interpolation of facets nor for insufflation.

2d An alternative configuration has on each side 2 receding breaking points along the 2 diverging dihedrals (upper bulging and lower receding), roughly at mid-length: dihedral pairs and windows continue from there ascending and tapering/converging towards the 2 points on the roof, still diverging from the aircraft's longitudinal axis, but at a greater edge-to-1.axis angle; this is the "goose" configuration.

In this case there are in each one of the 2 perimeters (lower and higher) 4 dihedrals and 3 breaking points; all of them deserve again attention concerning faceting and insufflation; there is also the inclined frontal upright edge, as previously described, needing neither interpolation of facets nor insufflation;

it is noted that there are no single elements (window, receding dihedral and edge, and bulging dihedral and edge) on each side, like in the previous case (2c. above); there are front and rear corresponding elements (2 windows, 2 receding and 2 bulging dihedrals, and their corresponding 4 edges) and one receding upright dihedral and edge (connecting these front and rear elements) on each side (left and right) instead.

2e A second alternative configuration has everything from the previous one (2d. above) with the difference that on each side the 2 breaking points of the (upper bulging and lower receding) dihedrals are bulging instead of receding, that is the dihedral pair and the window continue from there ascending and tapering/converging towards the 2 points on the roof, but in this case on a direction towards the rear, a direction lying in a vertical plane parallel to the aircraft's longitudinal axis, thus making for a "U" configuration.

2f A third alternative configuration has everything from the previous one (2e. above) with this difference: on each side the 2 breaking points of the dihedrals are bulging at a more intense degree, that is the dihedral pair and the window continue from there ascending and tapering/converging towards the 2 points on the roof, but in this case converging towards (instead of diverging from, or proceeding in a vertical plane parallel to) the aircraft's longitudinal axis; this is the "O" configuration.

2g Besides the previous 4 configurations (2c., 2d., 2e., 2f. above) of the flight deck's 2 (upper and lower) diedral perimeters, addition of a frontal part of the flight deck (entailing the addition of: a frontal window; 2 frontal dihedrals and edges, the upper bulging and the lower receding; one more bulging frontal upright edge, making for a total of 2 such edges; and 2 more bulging frontal breaking points for the 2 dihedral perimeters, making for a total of 4 such breaking points between a frontal and a side dihedral: the 2 being bulging in the upper perimeter, and receding in the lower one) results in the creation of further 4 configurations, corresponding to the previous 4 ones (V, goose, U and O respectively): the frontal—V one, the frontal—goose, the frontal—U, and the frontal—O ones (the latter being the theoretically complete configuration, cf 2c. above).

2h In the 2 perimeters of the flight deck, the edges are disposed at acute angles, or are parallel to the longitudinal axis as a rule; the only 2 (perpendicular) exceptions from the rule are the (potential) frontal and the (potential) joint rearmost part of the 2 perimeters:

A In the case of a flight deck with a frontal window (the 4 "frontal—"cases in 2g. above), this window is disposed on a plane inclined to the horizontal plane of the craft and the intersection of the 2 planes is transversal to the craft, and similarly the 2 frontal dihedral and edges (upper bulging ones and lower receding) are disposed perpendicular to the longitudinal axis.

B At the back of the flight deck's roof, there are no distinct parts of the 2 perimeters, since on each side (left and right) the 2 diverging (cf 2c., 2d. above) or alternatively the 2 front-to rear (cf 2e. above) or converging (cf 2f. above) edges on each side extend to final convergence between them at a point on the roof: the 2 such points of convergence (left and right) are symmetrical to the plane perpendicular to the aircraft's horizontal plane and passing from its longitudinal axis.

C At the rear end of the flight deck's plane roof there is either a continuing plane with the same inclination (in slight descent) reaching the trailing edge (the edge of the trailing bulging dihedral) of the flying wing or a wide obtuse (close to 180°) dihedral between the quite-horizontal roof of the (small) flight deck and the sloping back plane leading to the trailing edge, 2f The issue of dihedral-ising aeroplane fuselages of traditional configuration is also included in this discussion as a further field of application of the dihedrals-proposal, since the notion of fuselage bears a certain resemblance with the flight-deck one. The long, cylindrical fuselage configuration having prevailed for decades is to be superseded by a hexalateral prism (with no air insufflation alongside to it). And accordingly for the old-style conical protruding front part of the fuselage, comprising electronics and other equipment: a configuration with 3, 4, or 6 facets (yielding a tri-, quadri-, or hexalateral pyramidal form respectively, with the pyramid's apex in front) is to be substituted to the existing conical configuration.

3 The upper side of the wing

3a This is the bulging dihedral shaped by the upper side of the left and the right half-wings and of other horizontal flight elements, like canards, slats-flaps-ailerons, and tailplanes-elevators (if and) when these integrate into the design of stealth aircraft.

In the wing, its edge is disposed (diverging-wise) at an acute edge-to-l.axis angle and is situated at mid-width between the 2 edges (leading and trailing ones), and similarly in the other flight elements.

In the following, the case of the wing's up dihedral is discussed.

3b This kind of dihedral is quite wide as a rule, close to 180°, while the lower side of the wing is plane as a rule.

There are cases of applying a breaking point (either receding or bulging) onto one or both facets of the up dihedral, at roughly mid-length of each half-wing, as described in the foregoing (C.2f. above).

There are also cases of variable geometry in the wing: either horizontal, whereby a great part of the half-wing rotates in its own plane and changes its edge-to-l.axis edge, or vertical, described in detail in the following (O.3b. below), whereby the wing's rear part revolves down, round a secondary axis being in line with the wing tip. In this case the lower wing side describes a narrower dihedral than the upper side does (cf O.3b. below), and its aerodynamics is supported by insufflation elements (cf O.4. below).

3c Both the fore-facet and the aft-facet of the up dihedral angle taper (in width and in thickness) towards the wing tip. Following design priorities, at roughly mid-length of each half-wing these 2 dimensions (transversal to the wing's longitudinal axis and vertical to the wing's plane respectively) may undergo an alteration or readjustment of tapering degree towards the wing tip, so creating a breaking point (cf C.2f. above): either tapering with a lesser degree, so extending the wing-span with little additional air resistance (creating a receding breaking point), or a greater one, so shortening the wing-span but keeping the craft's bulk for storage space (creating a bulging breaking point).

3c In such a case, at the 2 places of such a tapering degree alteration, one in each half-wing, either only one of the (bulging) up dihedral's facets (the fore- or the aft-facet) is broken, or both facets are broken; in both cases the up dihedral and its edge are broken. Each broken facet results in a lengthwise 2-successive-facets situation spanning the half-wing's length, with a dihedral in-between and its "upright" edge starting at the bulging-up-dihedral's breaking point and reaching to the leading or the trailing edge, further creating there another breaking point. The 2 successive parts of the (bulging) broken up dihedral edge meet at the breaking point with either one or 2 "upright" edges (in case one or both facets are broken respectively). The breaking points of the up dihedral and of the leading edge deserve attention concerning air insufflation; attention is paid on having "upright" edges (ascending and descending ones, at the ascending and the descending facets of the up dihedral respectively) disposed parallel to the aircraft's longitudinal axis or thereabouts, in order not to be in need to insufflate their dihedrals' facets altogether.

4 The leading edge

This is the frontal part of the wing, critical for creation of lift force and sustenance of flight. It is a highly acute dihedral for stealth-related reasons, but it is rounded to a certain extent at its tip by design for aerodynamic reasons. Application of the 2-step optimisation proposal, i.e. facets interpolation and air insufflation, is to change the character of the wing section altogether and to be a part of stealth philosophy sine qua non from then on.

This application is described in detail in the following, at the chapter (N. below) on the bulging leading dihedral.

5 The wing underside

In the following (O. below) the flat lower side of the wing and the working proposals for achieving variable geometry are discussed.

6 In the following 2 chapters on interpolation and on insufflation (E., F. below) some estimates are proposed for faceting dihedrals and insufflating air in general; in the further following chapters (G. to O. below) more estimates are proposed, specific for every kind of dihedral in its respective chapter.

E Interpolation of facets (articles 1 to 2)

1 Optimising dihedrals through addition of facets:

1a Concerning the receding dihedrals:

The high velocity of the aircraft's transfer in the atmosphere causes by reaction the violent ramming in by the air met, incoming air-wise, on the fore-facet of every receding dihedral disposing one such.\

This causes acceleration effected on the "incoming" air sending it up to the aft-facet; this acceleration force comes into existence in a narrow zone in contact with the dihedral's edge and changes instantly the direction of incoming air; it has locally a high value and causes friction and heat, wear of the material, and a strong resistance to progress in flight, the latter having the direction perpendicular to the receding aft-facet' s plane, which makes for a high-value resistance-component directed longitudinally, against flight.

1b Concerning the bulging dihedrals:

In bulging dihedrals, the incoming air falling on the fore-facet (which coincides with the aft-facet of the corresponding receding frontal dihedral situated lower) deviates and follows the direction of this plane, causing friction and pressure in the process; then, past the area of the edge, it follows the direction of the aft-facet plane, on the flight deck roof, roughly coinciding with the flight's direction; the instantaneous change of direction causes intense turbulence in the front part of the aft-facet and moderated turbulence in important part of the aft-facet's (the roofs) afterpart. The 2 effects, pressure and turbulence, cause resistance to air; and friction and turbulence cause heat and cavitation, hence wear of the material 1c In parallel, the air ingests energy while causing heat in crossing both receding and bulging dihedrals and its ionisation ensues; this makes the air traceable and the aircraft discernible to modern beaming systems.

1d Concerning the proposal of facets interpolation: The facet interpolation proposal is a novel design issue which consists in widening the zone of applying the acceleration force upon the deflected incoming air, a certain degree of smoothing the abrupt change of air direction (the discontinuity) by adopting a roughly curve-like broken line, transversally to the edge; this design philosophy results in substantially lessening the acceleration's maximum value, the longitudinal component of resistance force, heat produced, and the degree of wear of the material. The widening is effected by interpolating one (1) or 2 (4) flat narrow zones-facets in the area so far occupied by the unique edge of the dihedral (2, 5), parallel to it, at successive intermediate inclinations between those of the original 2 facets, at angles expertly defined and with facets dimensioning expertly determined; in this way, one (3) or 2 (6) additional edges and equal additional dihedrals are created in the process, thus breaking the unique dihedral (2, 5) into 2 (3) or 3 (6) new dihedrals respectively such widening can be and is actually effected upon every dihedral, be it receding (8) or bulging (12), and it is wise to accomplish it to all the aircraft's dihedrals for aerodynamic reasons, with only one exception though (cf O.4a. below): the flap-down receding dihedral in the wing's lower side does not accept optimisation through interpolation of facets, 1e It is not recommended to interpolate more than 2 zones (facets) onto any receding or bulging dihedral of the aircraft, since incoming detecting beams would thus be reflected to more directions, and there are indications that borderline zones of a reflecting surface\ increase imperceptibly the reflected signal locally, and
diffuse slightly the signal farther than the geometrically right direction.

An exception to this rule, of interpolating 2 facets at most, can be the bulging leading dihedral (the wing's leading edge): the imperative to dispose perfect aerodynamic qualities may lead designers to adopt 3 or more facets in this case, always keeping in mind though that the leading edge is prominently visible ahead in front and prone to be the target of quite a number of tracing beams.

1g The new design, interpolation of facets, thus targets the facility to achieve higher speeds and agility, the reduction of resistance to air, of material's wear, and of consumption, and reduction of the traceability degree of the deflected air and of the aircraft as a whole.

2 Dihedral's measuring and dimensioning

2a In case that the interpolation of one facet (12') in a bulging dihedral (12) creates 2 equal bulging dihedrals (11), each one equals half the original dihedral augmented by 90°, since angle $b(11)=c=a/2(12)+90°$, and in general, either being equal (11) or unequal (13), these 2 dihedrals have a sum equal to the original dihedral plus 180°, since angles $b+c(13)=[a'(14)+90°]+[a''(14)+90°]=a'+a''+2\times 90°=a(14)+180°$.

In case a bulging dihedral turns into 3 bulging dihedrals through interpolating 2 facets, these 3 have a sum equalling the original dihedral plus 360°, and so on with further interpolation, with more facets and dihedrals.

In general, through interpolation of N facets in a bulging dihedral measuring D degrees, the sum D' of the total of the new dihedrals is equal to $D'=D+N\times 180°$. As for receding dihedrals, the by-angles of the original ones (8, 10), and of those resulting (7, 9) after facet interpolation has been effected, obey the same relations as above, since $b=c(7)=a/2+90°(8)$ for 2 equal resulting dihedrals, and $b+c(9)=a'+a''(10)+2\times 90°=a+180°$ for unequal ones.

2b In order to obtain a gradual creation of acceleration forces upon the air, and by this to achieve increased agility in flight and less wear of material due to friction with air, in the case of 2 dihedrals (by adding one facet) it is recommended for them to be unequal: the one situated in front, meeting first the incoming air, is wider than the second; and in the case of 3 dihedrals (adding 2 facets), similarly: the front dihedral is the widest of them all, the third one is narrower (measuring less in degrees than the first one), and the second one is the narrowest of the 3 (alternative relations between the 3 can be assessed through routine experimentation, namely whether the third dihedral must be equal to or even narrower than the second one).

2c This means, in terms of acceleration:

in case one facet is added to a receding dihedral and 2 receding dihedrals result: the air undergoes a moderately strong acceleration during transfer from the fore-facet of the front dihedral to its aft-facet, then a stronger acceleration in the thirdly met facet, which is the aft-facet of the second dihedral, and takes up with this stronger push having already encountered the moderated first push; and in case 2 facets are added and 3 receding dihedrals result: the air undergoes a moderately strong acceleration in the area of the front edge (the first of the 3 dihedral edges to meet the incoming air), then a stronger acceleration on meeting the second edge, and finally a slightly moderated acceleration, weaker than the second but still stronger than the first endured.

In this way, the integral of the diagram of acceleration versus time, as well as the one of pressure versus time, remains the same as in the original configuration, but the maximum value is lessened, becoming diluted in lengthened time, and aerodynamics is upgraded.

In case one facet is added to a bulging dihedral and 2 dihedrals result, the incoming air deviates first moderately and then more intensely to the new direction, helped in this by the further mass of air incoming in the line of the new direction itself, in this way smoothing the effect of abrupt direction alteration which causes turbulence/cavitation/wear.

In case 2 facets are added and 3 bulging dihedrals result, the deviation of incoming air becomes even smoother and, similarly as above, the best situation is to alter the direction first smoothly, then intensely, and finally moderately, between these 2 extents. \

2d A first estimate is to interpolate 2 facets in dihedrals whose edge is disposed perpendicular to the aircraft's longitudinal axis or thereabouts, to interpolate one facet in dihedrals from which a plane perpendicular to the aircraft's horizontal plane can be drawn at an angle of roughly 45° to this axis, and not to interpolate a facet in dihedrals from which the correspondingly drawn perpendicular plane is parallel to this axis.

2e By interpolating one facet in a dihedral of 120°, in the area of the flight deck, the resulting 2 ones having a sum of 120°+180°=300°, each one of them equals 150° in case they are equal, or they are for instance 165° the first one (upstream, in front of the edge) and 135° the second one in case they are preferred different in order to obtain a gradual increase of both air acceleration and direction deviation, aiming at better aerodynamics.

By interpolating 2 facets in the same dihedral of 120°, the resulting 3 dihedrals having a sum of 120°+180°+180°=480°, each one of them is 160° if they are equal, or in a more efficient distribution they are 168° the front one, 150° the second and 162° the third one, in order to obtain a smooth deviation at first, then a strong one and finally a less strong deviation but stronger than the first one.

2f The mentioned dihedral width is more or less the one encountered around the flight deck, be they receding or bulging, and slightly wider ones are encountered at the upper side of the wing, in its up dihedral.

The front part of the wing presents a bulging leading dihedral of the order of 15° in the images being available of stealth aircraft, the design thereof having been dominated so far not by pure aerodynamic criteria but by other priorities, shunning the long accredited wing cross sections in preference of flat surfaces; these are meant to surround fuel tanks, arms systems and other equipment, thus they are determinedly voluminous by design, with a clearly ascending facet starting at the leading edge.

2g By interpolating one facet in this bulging leading dihedral, the resulting 2 dihedrals add up to 195° and their first distribution estimate can be 60° and 135° (starting from the front one). With 2 interpolated facets the resulting 3 dihedrals add up to 375° and can be for example 65°, 140° and 170°. Eventually, with 3 interpolated facets the resulting 4 dihedrals add up to 555° and can be 70°, 145°, 165° and 175°: in the case of the leading edge, the foremost dihedral is set to around 65° (as a first, rough estimate) and the subsequent ones backwards are constantly increasing; but the issue of facets dimensioning is equally important. F Insufflation of air (articles 1 to 8)

1 Improvement of dihedrals through air insufflation

1a Along with the geometrical advancement described above (by interpolating additional facets in the area of a dihedral's edge), expert air insufflation in the area around the edge also helps in lessening wear of material and in diverting incoming air in non-jerky ways, this insufflated air coming between aircraft mass and incoming air and averting actual contact between the 2.

1b Insufflation is a design-and-process issue consisting in:
defining the points and areas to locate the insufflation functions at, and
installing the elements for them: acquisition (59), channelling, insufflation (18), recovery (22), and re-insufflation of air;
determining the air dosage and the ways of final discard; and
surveying the possibility and/or necessity of the air undergoing a process prior to insufflation/re-insufflation/discard, and installing elements for its implementation.

1c The geometric elements among these (that is, the air acquiring slots, insufflating slots and points, recovery slots and points, discarding points, and the air-forwarding pipings and mechanisms and air-processing devices) are fixed in the same way the interpolated facets also are, while the other elements, the quantitative ones (the air dosage—output and the air processing) vary depending on conditions- and mission-specific factors.

1d Dosage of the air insufflated, at first roughly determined by design, based on geometry and position of each dihedral, and consecutively adjustable following the course of the flight, can be fine-tuned by first conducting routine experimental trials on the basis of priorities and weather conditions: abrupt changes of flight direction, flight altitude, time of the day, temperature, internal dampness, external humidity, electrical charge of the atmosphere, etc.

The same is true, in design phase, concerning the number of acquisition/insufflation/recovery slots and the geometry of channeling elements for them. The same also stands for the possible ways of processing the air:
charging it in some way prior to be insufflated and re-insufflated, and
charging it in the same or possibly in another way prior to be finally disposed of.

1e As a result of the combinedly effected facet-interpolation and insufflation of the resulting multi-facet situation, the front between the incoming air and the insufflated air in every place, in cross section across the total of the facets, takes shape of a smoothly curving line without hiccups, with positive aerodynamic qualities.

1f By trial-testing insufflation's varying effects onto possible forms of the multi-facet situation throughout different tailorings of the interpolated facets and varying air dosage, important variations of the resulting virtual air-to-air front curve ensue; the best such virtual curve for the aircraft's desired flight capabilities is achieved by adopting a specific multi-facet form and by applying on it a specific combination of facet-to-facet air dosage in insufflation, to be decided upon on the basis of trials; (that is, the best such curve for flight during a mission in purpose: while the form of the inmovable facets and slots is set for good, the air dosage can be altered in function of the desired air speed range; and earlier, during design phase, trialing with varying facets and slots dispositions helps decide which disposition suits which conditions and missions;) Finally, facets and slots are decided upon having in mind the range of possible missions, and the air dosage is every time a function of next mission's requisites.

2 Acquisition of air

2a The acquisition of air to be insufflated is effected at places of (undesirable) high pressure, along lines of recessed outer skin of the aircraft, slot-wise, located either at the wing's lower face (59), parallel to the wing's longitudinal axis, or at a suitable frontal place of the fuselage, these lines being perpendicular to the flight direction as strictly as possible. These slots, narrow and long, possess sliding covers which are not detrimental to the aerodynamics of the craft either in open or in closed position; the slot spaces, having the form of a blade full of air, long and thin (and quite deep in the third dimension), are inclined to the outer skin facet's plane, at an angle of between 45° and 60° forwards (but not 45°, cf C.2h. above), and have the 2 opposite faces (front and rear) of their blade-form on 2 not-quite-parallel planes (which is meant for their not letting external incoming radiations reflect right back out).

2b Each air acquisition slot disposes a sliding, strong and thin, razor-like blade in contact with its rear face, and a mechanism to push it out during air acquisition phase, enough to force air into the slot. During non-stealth flight phases, the razor blade retracts and the cover closes the slot. The forced-in air enters the slot under pressure and is channeled to piping elements which guide it, eventually through processing mechanisms (cf 7c. below), to the closest points and slots of insufflation.

2c A first estimate is: 2 acquisition slots in parts of the leading dihedral's up-facet not conducive to lift force production (that is, parts corresponding to the flight deck and potentially to the engines), and one (or 2) slot underneath the wing along the whole wingspan, plus slots in other places of undesired high air pressures detected experimentally.

3 Insufflation slots

3a Concerning dihedral edges, insufflation (19) is effected along insufflation lines, or slots (18, 29-35, 38-40, 46-49, 52, 57, 58, 61)), which are installed:

upstream (15') (at the fore-facet) of, parallel and close to the edge (16) of receding dihedrals (15) to be insufflated; one unique exception is the flap-down receding dihedral (54) in the wing's lower side (cf O.4a. below): not disposing interpolated facets (cf E.1d. above), it has insufflation slots installed at both its upstream (57) and downstream facet (58); and both upstream and downstream (at both the fore-facet and the aft-facet) of, parallel and close to the edge of the bulging dihedrals to be insufflated.

Dihedrals to be insufflated are those from whose edge a plane can be drawn being perpendicular to the aircraft's horizontal plane and not parallel to its longitudinal axis.

3b The slots of insufflation (18) are, like the acquisition slots, narrow and long and possess sliding covers; they are ordered upstream of each (served, insufflated) receding dihedral edge, on the for-facet, parallel to and near the edge; each slot receives insufflation air through the forwarding piping elements (19') distributed along its extent, either directly from the nearest acquisition slot or through the eventual processing facility.

3c A the mean value of the dosage of air, and B the distance to the nearest forwarding piping element: narrow places of the slots coincide with the exit places (20) of the forwarding piping elements and broad places are at median points (21) between adjacent such exit places.

3d The upstream (farther from the edge) face of each slot is on a plane parallel to the edge, inclined to the facet's plane at an angle of between 45° and 75° (but not 45°, cf C.2h. above) towards the edge (in the following, the wording is: the slot . . . is directed, or inclined, at an angle of . . . etc.); the downstream face (the one close to the edge) is shaped in successive planes short in length, disposed at continuously lengthwise alternating receding/bulging dihedrals (quite close to 180° each), the dihedral edges being parallel to the plane of the other (the slot's upstream) face and perpendicular to the served (insufflated) dihedral edge, leaving at places a wider or a narrower opening of the slot, thus following the comment just expressed (2a. above), and avoiding both parallelism with the upstream face and incoming tracing beams' reflections to undesired directions (cf C.2h. above).

3e In each slot, the last, exiting parts (around 6 cm long) of the forwarding piping elements (19') are each straight, disposed on a plane parallel to the plane of the upstream face of the slot, exiting on the median line of the slot's bottom, at an inclination to the bottom such as to have the final length of 6 cm lying on a plane parallel to the aircraft's longitudinal axis and perpendicular to the aircraft's horizontal plane.

(In geometrical terms, this final part and all the final parts of forwarding piping elements in the aircraft lie at the intersection of their respective slot-upstream-face-plane with the plane parallel to the aircraft's longitudinal axis and perpendicular to the aircraft's horizontal plane, drawn from the piping's point of exit to the slot's internal space.)

4 Insufflation points

4a Concerning breaking points, insufflation is effected in distinct small areas (insufflation points) installed upstream of and near receding breaking points, and both upstream and downstream of and near bulging breaking points, especially those of the up dihedral at the upper side of the wing and of the leading edge (either in its original form or with the whole of its interpolated facets), and those in the upper and the lower dihedrals perimeter in the flight deck.

4b The insufflation points are short in length slots of insufflation, shaped like such as far as it concerns their covers, the upstream/downstream faces, their final exiting parts of piping, etc.; they serve distinct small areas, points of aerodynamic discontinuity where at least 3 edges or at most 4 edges meet (e.g. a breaking place of a facet or both facets on the upper side of the wing, the breaking point of the bulging up dihedral of the wing, the breaking points of the leading and the trailing edge of the wing, and the breaking points in the 2 dihedral edge perimeters in the flight deck contour).

4c These points are located at the extremities of the insufflated facets, each upstream of and close to such a place of discontinuity in the case of a receding breaking point, and both upstream and downstream of and close to the discontinuity place in the opposite case of a bulging breaking point; and they are positioned-aligned on straight lines parallel to the intersection of the corresponding broken facet's plane with the plane drawn from the breaking point and perpendicular to the aircraft's longitudinal axis, with one exception though (cf N.3a. below): insufflation points for the upper extremes of the wing's "upright" edges (when these edges are at an angle to the perpendicular plane parallel to the aircraft's longitudinal axis) are directed parallel to these edges.

The adjunction of insufflation points, directed sort of transverally to the aircraft, to the insufflation slots, directed parallel to the edges, is not detrimental to each one group's efficiency, due to difference in orientation between the 2; it is even definitely essential for mitigating the adverse effect resulting from the synergy of, for instance, the turbulence downstream of a bulging dihedral with the extra turbulence downstream of a bulging breaking point, and in other similar cases.

4d Stating such discontinuity areas by sections: There are insufflation points in the case of successive receding dihedrals (frontal-to-diverging-to-converging) of the lower dihedrals perimeter of the flight deck, at their fore-facets and on either side of each (potential) breaking point; also in the case of the corresponding successive bulging dihedrals above them, in the contour of the flight deck's roof, similarly, at both their fore- and aft-facets; also in the case of broken facets on the upper side of the wing (cf N.2f. below); and at the (potential) breaking point of the leading edge of each half-wing (cfN.2h. below); 4e in the latter case, due to the restricted area available, insufflation points adopt a point-form configuration (cf N.2i. below): the final straight 30 cm length of the piping has a triangular (or pentagonal, but not quadrilateral) cross section and exits directly on the outer skin surface, disposed on a direction at an angle of 30° to the local leading-edge-direction, wing-tip-wards. Other dimensions are a matter for experimentation, as is also the distribution of the points along the edge, and the air dosage (the output). This stands true for all items discussed in this article on insufflation points.

5 A first, approximate estimate of the number of insufflation slots needed to be created, and insufflation points needed to be installed, is:

5a one insufflation slot just upstream of every receding edge lying in a plane perpendicular to the aircraft's horizontal plane and disposed at 45° angle to the aircraft's longitudinal axis, 5b one slot just upstream of each receding frontal last-edge (frontal in its direction, last in back place in the succession of edges resulting from the interpolation of facets), and 5c 2 successive slots in the other receding frontal edges: one just upstream of the edge, its upstream face being inclined to the facet by between 45° and 55°, and the other one situated slightly back, its upstream face being inclined by between 65° and 75°.

5d One slot just upstream of (at a small distance from) every bulging edge lying in a plane perpendicular to the aircraft's horizontal plane and disposed at 45° angle to the aircraft's longitudinal axis, and one slot just downstream of the edge, 5e 2 slots upstream (one of them just upstream) of every frontal edge and 2more downstream (one of them just downstream) of the edge, and 5f slots based on experiments, in the facets interpolated to the leading dihedral.

5g 3 insufflation points upstream of every receding breaking point, whose succession of edges lies on a non-transversal vertical plane, on each one of the facets of the place, and 5h 3 insufflation point just upstream and one point just downstream of every bulging breaking point whose succession of edges lies on a non-transversal vertical plane, plus one more point at a small distance downstream of every bulging breaking point with important camber (convex form) of the aircraft's surface, on all the facets of every breaking point's eventual multi-dihedral configuration.

5i 2 insufflation points just upstream (towards the flight deck) of a potential receding breaking point of the leading edge, or 2 points just upstream and one more just downstream (towards the wing tip) of a potential bulging breaking point of the leading edge.

5j It is noted that all references in this article need attestation by experiments in aerodynamic channel and finalization through trials in flight.

6 Recovery—re-insufflation of air

6a It is recommended not to let insufflated air escape past the crossing of the edge area, since the distance from acquisition slots to insufflation ones is sometimes long; instead, the air in such instances is recovered, forwarded through bespoke piping, and re-insufflated at dihedrals nearby. This takes place in recovery slots (22, 60) situated on the aft-facet of each receding dihedral, parallel to the edge, shaped and dimensioned like the acquisition slots (59) (with maybe small changes), eased in their function by the fact that pressures stay increased in the area of the aft-facet of the receding dihedrals.

6b There is triple advantage versus exclusively acquiring insufflation air in frontal and wing-underside slots:

A the operation eases high pressures in aft-facet areas,

B there are savings in forwarding piping, complexity, and electric power needed, and C given that air passing through mechanisms and processes undergoes ionization and is liable to be detected, in this way less bulk of air in total passes through, entailing minimal overall ionization (though measures are taken against air-traceability, detailed in the following article on processing insufflation air, 7. below).

6c In places where recovery is needed but geometry does not favour the installation of recovery slots, recovery points are installed: recovery slots short in length, shaped like such. They are installed downstream of breaking points roughly parallel to the longitudinal axis:

- cavitation takes effect in such places, harmful for aerodynamics, and
- recovery slots cannot be installed, due to space tightness.

6d Powered suction is often effected for air recovery, if overall aerodynamic returns for the aircraft clearly exceed the cost of power put in; air is duly forwarded for re-insufflation.

6e A first estimate of air recovery elements is, one slot in the last facet of a multiple-facet configuration, either receding or bulging, at a small distance from the respective edge, and one recovery point at a small distance downstream of every breaking point of edges, either receding or bulging, in every one of its facets, and in case of a bulging breaking point, certainly downstream of its rearmost insufflation point.

7 Processing the air prior to (re)insufflation, and prior to final disposal:

7a Given that during the insufflation the air is highly visible at the moments it crosses bulging edges of the flight deck (from various directions), of the up dihedral (from ahead) and primarily of the leading edge (from ahead again), and given that free public information, written or else, is scarce, it is worthwhile to research the ways the insufflated or the discarded air reacts to various conditions regarding its traceability, and the results some processing of the air prior to insufflation and to final disposal can confer thereon.

7b There are processing ways to be tried and finalised through experiments:

- mixing air with water droplets, water vapor, plasma, etc.
- charging it with heat or cold, with electric or magnetic charge, (ultra)sound, etc.
- discharging it: dehumidifying, de-ionizing (freeing it of ions, or else), etc. (since air put through pipings, undergoing heat and friction, potentially ionizes).

7c The proceedings are done inside inborne facilities mixing the air with these materials and (dis)charging it as said, and forwarding it during actual flight via a mechanism to the insufflation and re-insufflation slots and points, and to final discharge; in this latter case, possibly mixing it with free air to dilute its detectable qualities, and dispersing it at multiple exit points, aiming at lessening the blend's detectability.

7d The conditions of flight may influence the reaction of insufflated and discarded air to incoming beam: acceleration, deceleration, supersonic front, altitude, electric charge of the atmosphere, etc. Processing method for insufflation of air and that for discarded air may be the same or may differ; experimentation is needed on this issue.

7e Charging the air magnetically means releasing magnetic non-metallic microparticle dipoles into the air through the exit piping of the insufflation slot, to be reclaimed at the opposite situated (across the edge) recovery slot, equipped with magnetised external lips and mechanism to suck the dipoles.

7f Charging the air electrically is either effected with negative charge (ions), or positive, or even through negative—positive alternation, rotating at moments at the same place or distributed in places or areas of the aircraft.

7g Affecting the air with ultrasound or with a part of the acoustic range can be either done from the bottom of the insufflation slot or from that of the opposite situated (across the edge) recovery slot, or even frontally from a transmitting line situated at the aft-facet.

7h The qualities of the surface material and of the embedded anti-tracing mesh and their interaction with processed air, either positive or adverse, are to be taken into consideration; the same is true regarding processed air's interaction with contrails.

7i The impact (on traceability) of the direction of insufflated air (and of discarded air) in relation to the detected direction of incoming tracing beams must be taken into account; e.g., inborne sensors detect a tracing beam (radar of other) coming from the side, and it might be worthwhile to install nozzles for discarded air's disposal and to have them directed accordingly (as per experiments) to evade detection-from-opposite.

8 Final disposal of air:

8a The air used in insufflation, in sequencing order being acquired, processed, insufflated, recovered, re-insufflated, possibly re-recovered and again insufflated time after time, is finally useless and gets discharged into the atmosphere as the last phase of the operations sequence in the "insufflation" procedure, in case there is no more scope for recovery and re-insufflation. The air to be released (or expelled) in this last phase has to be undetectable, and the processing necessary to attain this may prove inconsistent with the qualities (mixture and charges) that must reign in the mass of air to be insufflated; in such a case an accordingly right process takes effect one more time in order to achieve this indetectability.

8b The air is cooled and discharged-dispersed through multiple ducts (pipings) or short slots (like the insufflation points, short insufflation slots) exiting in the upper skin of the craft (in places not harmful to the low pressure reigning in the wing's upper side, and not visible/detectable from the front and from below), away from the motors to the possible extent, at positions to be determined through experiments. Alternatively, this air is conveyed to the motors' external ring dispersing jet's heat in case the motor units are of the fan-jet type or similar.

G Receding frontal dihedral angle (Flight deck) (articles 1 to 3)

1 This configuration is not in use in stealth design as a rule, since it is not sound for aerodynamics and for consumption, but is included here for a complete discussion of the issue (only potentially is it adoptable in case of having a short and narrow flight deck). It is a marginal case in design, having the edge on a plane perpendicular to the craft's longitudinal axis, and is the basis for considering other dihedrals having their edge oblique to this axis.

2 A first estimate of facets and slots is:

2a 2 facets interpolated, unequal dihedrals (cf E.2b. above) in the now-resulting 3-dihedral situation: the front one widest, the median one narrowest; in case the flight deck is situated close enough to the leading edge ([case 1]), either the 2 facets are tailored accordingly narrower, or only one facet is interpolated: the first (front) one of the 2 interpolated facets (the second facet in the now-resulting 4-facet situation) and the corresponding insufflation slots (recited in the following, 2c.B. below) may be cancelled. In case the flight deck floor begins at the leading edge ([case 2]), there exists no original receding frontal dihedral angle and so the implementation of the 2 interpolated facets is not considered: the place is part of the aircraft's integral leading edge across the whole of the wingspan.

2b 2 acquisition slots in the first facet, in the now-resulting 4-facet situation, that is in the up-facet of the leading dihedral: one at 60 cm from the leading edge, and one more (the rear one) at 60 cm more backwards; in [case 1] as above, the 2 slots are located accordingly closer to the leading edge and to one another; and in [case 2], the 2 slots are located at 15 and 30 cm distances from the leading edge respectively, lowermost on the front of the flight deck window.

2c A 2 insufflation slots in the first facet at the front, in the now-resulting 4-facet situation, because of the high pressures encountered: one at a distance of 60 cm upstream (in front) of the first of the 3 edges, if possible, and one just upstream of it; in [case 1], the front one of the 2 slots is located accordingly closer to both the rear acquisition slot and the first edge; and in the [case 2], the 2 insufflation slots are not implemented;

B 2 more slots are installed in the second facet: one at mid-width and one just upstream of the second edge; and C one more slot in the third facet, just upstream of the third edge (that is, just in front of the lowermost line of the flight deck window).

2d One recovery slot in the fourth facet (the flight deck window), just downstream of the third (last) edge, at the foot (the lowermost line) of the window; in [case 2], this recovery slot is not implemented.

3 In the standard case of non-existing frontal dihedral (and flight deck window) there are 2 diverging ones meeting at the front nose of the flight deck, discussed in the next chapter (H.2. below).

H Receding diverging dihedral angle (articles 1 to 4)

1 The case of a receding diverging dihedral happens on both sides of the flight deck of a flying wing, also on the front part of the sides of a helicopter's superstructure on top of its main body, and in other flying entities. In the case of this dihedral there is again pressure in the area of the aft-facet since the incoming air accumulates, due to the geometry of the place.

2 In the accepted flying-wing configuration of recent fast stealth aircraft there exist no frontal receding/bulging dihedrals or frontal flight deck window, only (on either side of the flight deck) a diverging window and diverging receding/bulging dihedrals, meeting at the nose in front, at an angle between the 2 sides which is double the edges' angle to the longitudinal half-axis backwards (edge-to-1.axis angle, cf C.2f. above); as described earlier (D.2c. above), window and dihedrals either ascend straight back to a point of the roof, the window tapering there and the edges of the 2 dihedrals meeting there, finally having 2 dihedrals (receding/bulging) on either side and one breaking point at the nose, or they undergo a breaking point at mid-length backwards and they (dihedrals and windows) continue diverging and ascending/tapering from there at a lesser edge-to-1.axis angle.

In the latter case there are 4 diverging dihedrals (2 receding and 2 bulging ones) plus one breaking point on either side, and one more breaking point at the nose; these deserve attention concerning facets, insufflation slots and points, and recovery slots, finalised in the next article (3. below).

3 3 a The dihedral (and its edge) ascends in its direction rearwards as a rule; its fore-facet coincides with the fore-facet of the up-dihedral of the flying wing, so the reduced air pressure reigning on the wing's upper face eases locally the geometrically-caused increased pressure; this makes for local variations in the value of air pressure, giving grounds for local differences in the dosage of the insufflated air and in the geometry of insufflation slots, finally rendering experimentation necessary.

3b The incoming air flowing at an angle to the edge of the dihedral, there is scope for only one interpolated facet per dihedral all round (either straight all the way back, or broken at mid-length), total 2 facets (left and right).

3c A first estimate for insufflation is, one insufflation slot per edge (either straight or broken) in the now-resulting 2-edge situation, just upstream (in front) of each edge, total 4 insufflation slots (left and right); and 3d only in the case of a broken flight deck contour, one 30 cm long insufflation point is installed just downstream (rearwards) of the side breaking point (that is, in the front area of the rear receding diverging dihedral angle) on each one of the now-resulting 3 facets (in the 2-dihedral situation).

3e one recovery slot (either straight or broken) just downstream (above and backwards) of the second (the rear one) edge in the 2-edge situation, that is at the lowermost line of the flight deck window, paying attention not to obstruct much the visibility through that part of the oblique window.

4 In the potential case of adopting a configuration with a frontal flight deck window, 4a the edge-breaking point between the 2 dihedrals, the (accordingly potential) receding frontal one and the (here discussed) receding diverging one, deserves attention concerning cavitation downstream of it (in the diverging's foremost area):

4b One 30 cm long insufflation point is installed in each facet of the diverging dihedral (in the now-resulting 3-facet situation) just downstream (rearwards) of the breaking point (3 insufflation points on the left side and 3 on the right side); experimentation is of importance for air dosage.

4c On the back of each one of these last points, at a distance of 30 cm, a recovery point of same dimensions finds rightly its place, on the 3 facets, on both sides of the flight deck (total, 6 recovery points); this relieves the pressure-and-turbulence residing in this place due to the geometry of the place.

4d The lack of geometric continuity in the breaking point between the now-resulting 3-dihedral receding frontal situation (G.2a. above) and the 2-dihedral receding diverging one (H.3b. above) induces the need for a short length of transition area, the metallic skin being moulded to a transitional shape changing smoothly and not protruding in the air.

i Receding converging dihedral angle (articles 1 to 5)

1 1a This case happens on both sides of the flight deck, on the rear (and in continuation) of the receding diverging dihedral, only in case this one (the diverging) does not reach all the way back along the side of the flight deck (cf 3. below); it is not the best condition aerodynamically, but the occurrence of convergings depends on the aircraft's design. It is also found in the rear part of the sides of a helicopter's superstructure on top of its main body, and in other flying entities.

1b There is the situation of both the 2 successive receding dihedrals (diverging/converging) ascending rearwards (a small flight deck in a large flying wing), or the one of the diverging dihedral ascending and the converging one descending (in case the flight deck extends much to the rear in a small-size flying wing configuration).

1c The geometry of the place causes reduced air pressure. Additionally, both the alteration of the edge-to-l.axis angle and the existence of the corresponding bulging converging dihedral in a position higher up, cause turbulence and the ensuing cavitation.

1d There is no need for any interpolated facet, and there is really not a clear notion of upstream and downstream: the insufflation slots and the air dosage are a matter for experimentation.

1e The lack of geometric continuity in the breaking point between the now-resulting 2-dihedral receding diverging situation (J.2a. above) and the original receding converging dihedral (K.2a. above) induces the scope for a short length of transition area, the metallic skin being moulded to a transitional shape changing smoothly and not protruding in the air.

2 There follows the issue of insufflating the area of the breaking point between these 2 successive dihedrals, one such on each side of the flight deck:

2a One 30 cm-long insufflation point per facet is installed in the 3-facet diverging situation just in front of the breaking point, and one more similar in dimensions insufflation point per facet on both converging facets just downstream (rearwards) of the breaking point at half the dosage of the first 3 ones (in total, 5 insufflation points on the left side and 5 on the right side); this is a first estimate, but again experimentation is of importance here. 2b On the back of these last points, at some distance, a recovery point of same dimensions finds rightly its place, on both facets, on both sides of the flight deck (in total, 4 recovery points); this relieves the pressure residing in this place due to turbulence.

3 This discussion also comprises the case of a receding dihedral having its edge parallel to its longitudinal axis: an edge which first ascends rearwards, then after a breaking point it goes descending. It is geometrically a particular case of the previously discussed one (1. above). It corresponds to a flight deck having a rectangular contour (and protruding up in all its length from the wing's contour), extending farther back (hence the existence of the descending edge) from the wing's up-dihedral edge (situated transversally mid-ships and along each one of the half-wings); not being sound aerodynamically as a rule, it remains a matter of design, concerning again a small-size flying wing with a rectangular flight deck extending far backwards.

In such a case there is increased pressure in the front part (ascending) and low pressure in the rear part (descending), along with turbulence in the rear part past the breaking point, but the air just flows in the direction of the edge: there is no scope for interpolated facets; air insufflation to edges (slots and dosage) and air recovery are a matter of routine experimentation.

4 Particular attention is paid to insufflating the 2 (left and right of the flight deck) breaking points of edges (ascending to descending) in the last case (3. above), since the concurrence of low pressure and increased turbulence deserves augmented insufflation effect: similar to the previous (2. above) analysis of insufflation and recovery points, equal in number such points are installed here too, but air dosage is a matter for experimentation.

5 The potential case of a receding rear-facing dihedral angle should not exist logically, on aerodynamic grounds; but it is discussed here in order to complete the issue of a theoretical contour of the flight deck.

(In practice, the plane of the flight deck roof continues backwards in one of 2 alternative ways till meeting the trailing edge, cf D.2e.C. above: the afterpart's inclination is either the same with that of the flight deck roof, or there is a very wide dihedral, close to 180°, between the 2 planes.)

There is low pressure due to the geometry of the place, and cavitation due to the (logically) existing bulging rear-facing dihedral angle, higher up. There is no need for an additional facet; insufflation is exclusively a matter for experimentation.

J Bulging frontal dihedral angle (articles 1 to 3)

1 The configuration of the bulging frontal dihedral, on top of a rectangular flight deck, is not sound aerodynamically (hence not in use as a rule) compared to the currently adopted one of 2 bulging diverging dihedrals meeting at the front nose, on top of the corresponding 2 receding ones discussed earlier (H. 2. above). (Aerodynamics put aside, this configuration is critical concerning radar and aircraft safety: more so than both said bulging diverging dihedrals and receding frontal dihedral configuration discussed earlier, G.1. above; incoming detecting beams mainly originate up front, and transversally disposed elements reflect them to undesired directions; measures to abate observability, like bespoke processing of isufflated air, are welcome.

This dihedral takes air from the (inclined) potential frontal flight deck window and leads it to the (roughly horizontal) flight deck roof. The geometry of the place and the conditions of flight cause turbulence in the area. It is a case for beginning discussion of bulging dihedrals, for a complete theoretical view of flight deck aerodynamics.

2 A first estimate of facets and slots is:

2a2 facets interpolated, unequal dihedrals (cf E.2b. above) in the now-resulting 3-dihedral situation: the front one widest, the median one narrowest; the 2 facets are narrow for not interfering much in the visibility through the flight deck window: more so the first facet.

2b no acquisition slot in the first facet (in the now-resulting 4-facet situation), that is in the upper part of the flight deck's frontal window: it would harm the visibility through it.

2c A 2 insufflation slots in the first facet (the window), because of the high pressures encountered: one at a distance of 15 cm upstream (in front) of the first of the 3 edges (that is, under the window's top), and one just upstream of it; effort is taken for the the lower slot not to interfere much in visibility through the window: the bare slot, made from transparent parts, is embedded into the window material, certainly keeping steadfast under the air pressure reigning in the place; B 2 more slots are installed in the second facet: one at mid-width and one just upstream of the second edge respectively; C similarly, 2 more slots in the third facet, at mid-width and just upstream of the third edge (that is, just in front of the flight deck roofs foremost line; and D one more slot in the fourth (last) facet, the flight deck roof, just downstream of the third (last) edge: behind the foremost line of the roof.

2d One recovery slot in the fourth facet (the flight deck roof), at 30 cm downstream of the third (last) edge, in the plane of the roof.

3 The bulging leading dihedral is a particular case of bulging frontal one, important for creating the best part of the lifting force. It is discussed further on, in the respective chapter (N. below).

K Bulging diverging dihedral angle (articles 1 to 3)

1 The bulging diverging dihedral is situated on top the receding diverging one in the adopted 2-diverging-windows (meeting at the front nose) flying-wing configuration of fast stealth aircraft, and coincides with the top of the flight deck window. It is also found in the upper front part of the sides of a helicopter's superstructure on top of its main body, and in other flying entities. It's configuration is critical concerning radar and aircraft safety, quite similarly as the bulging frontal dihedral's one (J.1. above). As has been described earlier (D.2c. above), this dihedral, horizontal or slightly ascendant backwards following the flight deck roof inclination, either reaches straight back to a point of the roof, the window tapering there and the edges of the 2 dihedrals (receding/bulging) meeting there, finally having in total one bulging dihedral on either side and one breaking point at the nose, or it undergoes a breaking point at mid-length backwards and continues (with the same roof inclination) diverging from there at a lesser edge-to-1.axis angle, to converge with the corresponding receding diverging dihedral at a point of the roof. In the latter case there are 2 bulging diverging dihedrals plus one breaking point on either side, and one more breaking point at the nose; these deserve attention concerning facets, insufflation slots and points, and recovery slots, finalised in the next article (2. below).

2 The fore-facet receives incoming air under pressure, and the aft-facet undergoes turbulence. A first estimate for facets, slots and points is as follows:

2a The incoming air flowing at an angle to the edge of the dihedral, there is scope for only one interpolated facet per dihedral all round (either straight all the way back, or broken at mid-length), total 2 facets (left and right). The first facet in the now-resulting 3-facet situation has small width, not to interfere much with pilots visibility (in the upper part of the window), and this has a side influence on the geometry of the rear facet too.

2b A first estimate for insufflation is, one insufflation slot per facet (either straight or broken) in the now-resulting 3-facet, 2-edge situation: one each just upstream (in front) of each edge, and one just downstream (behind) the second edge (on the roof), total 6 insufflation slots (left and right); and 2c only in the case of a broken flight deck contour, 6 insufflation points 30cm long are installed in the area on either side of the flight deck: 3 of them, each one in one facet just upstream (in front), and 3 more, each one in ono facet just downstream (rearwards) of the side breaking point (that is, in the rearmost part of the front bulging diverging 2-dihedral situation and in the foremost part of the rear bulging diverging one respectively), total 12 insufflation points all round (left and fight).

2d one recovery slot (either straight or broken) at 30 cm distance downstream of the second (the rear one) edge in the 2-edge situation, that is at the foremost (oblique) line of the flight deck roof.

3 In the potential case of adopting a configuration with a frontal flight deck window, 3a the edge-breaking point between the 2 dihedrals, the (accordingly potential) bulging frontal one and the (here discussed) bulging diverging one, deserves attention concerning turbulence taking effect downstream of it (in the diverging's foremost area):

3b One 30 cm long insufflation point per facet is installed in the diverging 2-dihedral situation just downstream (rearwards) of the breaking point, in the foremost part of the diverging 2 dihedrals: 3 insufflation points on the left side and 3 on the right side; experimentation is of importance for air dosage.

3c At a distance of 30 cm downstream of each one of these points a recovery point of same dimensions finds rightly its place, in the 3 facets, on both sides of the flight deck (total, 6 recovery points); this relieves the turbulence residing in this place due to the geometry of the place.

3d The lack of geometric continuity in the breaking point between the now-resulting 3-dihedral bulging frontal situation (J.2a. above) and the 2-dihedral bulging diverging one (K.2a. above) induces the scope for a short length of transition area, the metallic skin being moulded to a transitional shape changing smoothly and not protruding in the air.

L Bulging converging dihedral angle (articles 1 to 4)

1 1a This case occurs on both sides of the flight deck, on the rear (and in continuation) of the bulging diverging dihedral, only in case this one (the diverging) does not reach all the way back along the side of the flight deck (cf 3. below); it is not the most efficient condition in the aerodynamic sense, but the occurrence of convergings depends on the aircraft's design. It is also found in the upper rear part of the sides of a helicopter's superstructure on top of its main body, and in other flying entities.

1b The geometry of the place causes reduced air pressure, and the alteration of the edge-to-1.axis angle causes turbulence and the ensuing cavitation in the area downstream of the breaking point.

1d There is no need for any interpolated facet, and there is really not a clear notion of upstream and downstream transversally to the edge: the insufflation slots and the air dosage are a matter for experimentation.

1e The lack of geometric continuity in the breaking point between the now-resulting 2-dihedral bulging diverging situation (J.2a. above) and the original bulging converging dihedral (K.2a. above) induces the scope for a short length of transition area, the metallic skin being moulded to a transitional shape changing smoothly and not protruding in the air.

2 There follows the issue of insufflating the area of the breaking point between these 2 successive dihedrals, one such on each side of the flight deck:

2a One 30 cm-long insufflation point per facet is installed in the 2-dihedral diverging situation just in front of the breaking point, and one more similar in dimensions insufflation point in both converging facets just downstream (rearwards) of the breaking point at half the dosage of the first 3 ones (in total, 5 insufflation points on the left side and 5 on the right side); this is a first estimate, but again experimentation is of importance here.

2b On the back of these last 2 points, at some distance, a recovery point of same dimensions finds rightly its place, on both converging facets, on both sides of the flight deck (in total, 4 recovery points); this relieves the pressure residing in this place due to turbulence.

3 This discussion also comprises the case of a bulging dihedral having its edge parallel to the aircraft's longitudinal axis, geometrically a particular case of the previously discussed one (1. above). It corresponds to a flight deck with parallel roof sides and sloping or even upright windows; not being sound aerodynamically as a rule, it remains a matter of design.

In such a case there is no teal notion of up- and downstream transversally to the edge; the air flows parallel to the edge: there is no scope for interpolated facets; air insufflation and recovery slots are deemed not necessary, but they are a matter for experimentation.

4 The potential case of a bulging rear-facing dihedral angle should not exist logically, on aerodynamic grounds; but it is discussed here in order to complete the issue of a theoretical contour of the flight deck. (In practice, the plane of the flight deck roof continues backwards till meeting the trailing edge, cf D.2e.C. above.) There is low pressure due to the geometry of the place, and turbulence (and cavitation) due to the incoming air encountering a side space and curling down and even up. There is scope for 2 or even 3 interpolated facets (the comment against the suitability of surplus facets, in E.1c. above, does not stand for rearward directions); insufflation is exclusively a matter for experimentation.

M Bulging up dihedral angle (Wing area) (articles 1 to 8)

1 At the upper side of the wing's parts on the left and on the right of the flight deck, (the 2 half-wings), there is the bulging up dihedral, whose fore-facet is the leading dihedral's up-facet, and its aft-facet is the trailing dihedral's up-facet (ascending and descending respectively, with a vision direction front-to-rear). Thus in the upper side of the wing there is succession of 3 bulging dihedrals: the leading, the bulging up, and the trailing. This consideration also stands for old-style wings, flaps and ailerons, tailplanes and elevators, also for canards, and even for slats if the notions of diehedral-ising and air insufflation are to reach that far 2 Places of creation of important in absolute values negative pressures in a wing are:
primarily, the front part of the up dihedral's fore-facet (the ascending one) which is the up-facet of the acute leading edge dihedral, and
secondarily, the front part of the up dihedral's aft-facet (the descending one) which is the up-facet of the acute trailing edge dihedral: that is, the area behind the up-edge.

3 A first estimate of facets and insufflation (to be finalised by experimentation) is: 3a 6 insufflation slots at the front part of the ascending facet, 3 more slots at the area upstream (in front) of the up-edge (the rear part of the ascending facet), and 6 more slots with lesser air dosage downstream of (behind) the up-edge. Quantity and quality factors are a matter for experimentation. The successive slots at each facet are disposed radially, their lines all passing from (meeting at) the wing tip.

3b A case of interpolating one facet into the up dihedral (for attaining a purportedly better virtual curve of incoming air front aerodynamically), and so having 2 up-edges as a result, is matter for experimentation; such an interpolated facet tapers towards the wing tip in accordance with the whole half-wing; the scope for its insufflation is:

3c 2 insufflation slots downstream of the front up-edge and one more slot upstream of the rear up-edge; the rear up-edge is located above the edge of the variable-geometry-dihedral situated on the plane of the lower side of the wing.

3d At the place of a facets' potential breaking point at roughly mid-length of the half-wing, 4 insufflation points are installed in succession in the rear part of the ascending facet in the area upstream of the breaking point, and 6 more insufflation points with lesser air dosage are installed in the front part of the descending facet in the area downstream of the breaking point: these 2 areas are diametrically opposite by the breaking point itself, and are situated roughly one behind the other due to the wing's inclination to the longitudinal axis (its edge-to-1.axis angle).

4 The combinations of successive insufflation slots and of successive insufflation points are optimised through 4a rightly locating each one of the slots across the facet considered and each one of the points in the area allotted, in order to achieve a full and compact virtual incoming-air front;

4b expertly defining each slot's and point's direction of air (i.e. inclination of upstream slot face, cf F.3b. above) in order to achieve the best possible virtual incoming-air front: by determining an efficiently gradual alteration of the inclination from slot to slot and from point to point.

5 The creation of a breaking point onto the bulging up dihedral's fore- or aft-facet results in creating a corresponding fore- or aft-"upright" edge and dihedral in the wing's contour, disposed at an angle to the broken up dihedral's edge, in front of it or behind it, starting at the breaking point and reaching to a point of the leading or the trailing edge respectively, where a further breaking point is created. If the bulging up dihedral's 2 facets (ascending and descending) are broken (at the same point, by conception), 2 "upright" edges and dihedrals (the fore- and aft-ones) are created, as well as 2 more breaking points, the leading edge's and the trailing edge's ones. The character of receding or bulging is common to all of the following: the up dihedral's breaking point, the pair of the up dihedral's broken facets (ascending and descending), the corresponding pair of fore- and aft- "upright" edges and that of the respective dihedrals, as well as the breaking point of the leading edge and that of the trailing one, the latter being researched as follows: the lower side of the wing remaining plane (horizontal) by conception, the breaking points of the leading and the trailing edge are each designated bulging or receding in accordance with the horizontal angle between each edge's 2 successive parts on either side of the respective breaking point being obtuse or its by-angle being obtuse respectively (they are never right or acute).

6 In case one or more facets are interpolated in the bulging leading dihedral (cf N. below), the above described fore- "upright" edge also continues (in broken form) onto all interpolated facets, all of them sharing the same character, receding or bulging.

7 Forced suction to produce negative pressures in places where they are needed, powered recovery elements (slots and points, cf F.6d. above) and other similar techniques also help achieve the desired pressures and velocities. This is true for all parts of the aircraft's contour and is a matter for experimentation.

8 Configuration of wing tips, V-double elevators, ailerons and other flight elements marginal to or outside the flying wing's bulk, abandoned or unwelcome so far in stealth design, if (re)introduced in future craft, is to do without inclinations resulting in right or half- right angles or parallelism (cf C.2h. above) in working interaction with the surfaces of the main bulk (the flying wing) of the craft; this refers to their potential deployed and retracted modes, not to the entirety of their eventual moving in-between.

N Bulging leading dihedral (Leading edge) (articles 1 to 5)

1 1a The bulging leading dihedral has its low-facet horizontal (the lower side of the wing) and the up-facet ascending; it is part of a 3-dihedral succession in the wing's upper side (leading, up, and trailing ones), all 3 bulging, resulting in a situation with negative air pressure in the whole wing width.

1b It is disposed in a swept-back position, in acute edge-to-1.axis angle. Its 2-step optimisation is the most critical of all aircraft's parts, concerning 2 issues:

A creation of an efficient lift force diagram, yielding high total lift, of a moderate maximum absolute value of negative pressure, and of a low drag force, and B traceability—detectability of the part, in this case the wing.

2 A first estimate of facet interpolation and air insufflation is:

2a Interpolation of facets:
  either one interpolated facet, ascending at a quite steep angle rearwards, or better 2 interpolated facets, the first (front) one, again ascending at a steep angle rearwards, and the second one, disposed rearwards at a 45° angle to the wing's lower side plane; their dimensioning is a matter for experimentation.

2b A The first of these interpolation proposals results in a 2-dihedral situation: the front one, acute, whose edge is again the leading edge of the wing (and the aircraft as a whole), and the second one, obtuse, disposed higher and slightly back, which bears the greatest part of the whole wing's integral of of negative pressure.

B the second interpolation results in 3 dihedrals; in succession: the acute front one, the first obtuse and the second obtuse one.

2c A first estimate of insufflation in the first case, with a total of 2 dihedrals and one interpolated facet, is:
  at this facet's front part: 2 slots directed (that is, having their upstream face directed, cf F.3b. above) forward, behind them: 6 slots having a gradual shift of direction from perpendicular to the facet (the front slot) to vertical (the rearmost one), in a fan-wise situation, and
  at the facet's rear part: 2 slots directed backwards at an angle of 30° to the facet's plane (slightly backwards from the vertical). The distribution of the slots across the facet and the air dosage are a matter for experimentation. A first estimate is to have the slots evenly distributed.

2d In the second case (total 3 dihedrals, 2 interpolated facets) which, although more complicated, treats better the aerodynamic issue, the insufflation part is as follows:
  at the first (interpolated) facet: 7 slots, distributed evenly across the facet;
  at the second facet, disposed at a rearward inclination (cf 2a. above) at an angle of 45° to the wing's lower side plane: 7 slots, disposed in a fan-wise configuration: from the front one directed at forward-45° to the facet (that is, horizontal forward) gradually to the rearmost one directed at backward-45° to the facet (that is, vertical upward), evenly distributed across the facet.

An alternative situation is to have the first facet's slots disposed in a fan-wise configuration whereby the first slot (the one near the leading edge) is directed slightly downwards in order to create a down-driven frontal part of the virtual air front, for more efficient aerodynamic functioning.

2e In an eventual case of even more interpolated facets (with 3 such, and a total of 4 dihedrals), the slots are defined and distributed accordingly.

2f It is reminded: A the next facet behind there, the up dihedral's fore-facet, is insufflated as itemisedly described in the foregoing (M.3a. above): 6 slots at its front part, in the area behind the now-resulting edge of the second obtuse dihedral (cf 2b.B. above); and B the insufflation elements concerning the breaking point of the bulging up dihedral have been itemised in the foregoing (M.3d. above).

3 Insufflating the fore-"upright" edge and the leading edge itself:

3a In case the fore-"upright" edge is disposed at an angle importantly differing from the parallel to the aircraft's longitudinal axis, the broken ascending facet is insufflated near its upper extreme (adjacent to the up dihedral's edge, or to its interpolated facet) through 4 insufflation points in its area upstream of the edge, and only in the case of a bulging breaking point of the bulging up dihedral 4 more insufflation points in its area downstream of the edge; being an exception to the rule on orientation of insufflation points' direction (cf F.4c. above), these points are directed parallel to the "upright" edge, evenly distributed in their allotted areas: they are short insufflation slots and they are in reality meant to behave like such.

3b The breaking of the ascending facet resulting in the creation of a fore-"upright" edge and further In the creation of a breaking point at the original leading edge, the now-resulting 2- or 3-dihedral situation (in the direction across this edge) is insufflated as follows: each interpolated facet, in broken configuration, has 4 insufflation points in its area upstream of and parallel to the broken facet's edge, and only in the case of a bulging situation of the facet (better said, situation of the total of the interpolated facets) 4 more insufflation points in its area downstream of the edge.

3c In the case of the bulging leading dihedral's edge remaining intact, with no interpolated facets, a special point-form configuration of insufflation points, described in the foregoing (F.4c. above), is adopted at the restricted area available to insufflate the breaking point of the leading edge: 4 point-form insufflation points are installed in the edge's line, at a short length allotted for them upstream of the breaking point and, only in the case of a bulging breaking point, 4 more points at a short length allotted downstream of the breaking point, both groups being evenly distributed each along its allotted length of the edge. It may prove better aerodynamics if this insufflation of the broken leading edge itself is added to the one described earlier (2c., 2d. above) of the broken facets interpolated to it.

3d Another configuration of the area between the breaking point of the wing's up dihedral and that of the leading edge is possible, whereby there are 2 fore-"upright" edges: one of them, the front-fore-"upright", or A-upright, lies towards the flight deck and the other one, the back-fore-"upright" edge, or B-upright edge, lies towards the wing tip.

In one version of this configuration, the A-upright connects the up dihedral's breaking point with a point along the leading edge's straight part upstream (in front) of its breaking point, and the B-upright connects a point along the up dihedral's edge part downstream (in the back) of its breaking point with the leading edge's breaking point.

In the opposite configured version, the A-upright connects a point along the front part of the up dihedral's broken edge with the leading edge's breaking point, and the B-upright connects the up dihedral's breaking point with a point along the rear part of the broken leading edge.

Both these versions have the ascending facet broken in 2 places (the A- and the B-upright) into 3 parts; the parts first and third, i.e. the part upstream (in front) of the A-upright and that downstream (in the back) of the B-upright, are both flat and inclined as in the simple case of a broken ascending facet with a single (fore-)"upright" edge, and the median part in-between is a narrow quadrilateral warped surface running from the area of the up dihedral's breaking point to the area of the leading edge's breaking point.

This narrow warped surface resulting in each one of the 2 half-wings is not really cause for much concern radar-wise (the 2 fore-"upright" edges not being far distant from one another) but it can be formatted, to evade this concern at all, in consecutive narrow level zones or steps, each one turning in direction slightly in relation to its adjacent one, a spiral inside the quadrilateral's contour; each step's "tread" is parallel to the aircraft's horizontal plane, and each upright "riser" between 2 adjacent treads is inclined to said plane by an angle of around 30° to both avoid 180°-reflections and minimise resistance to air.

The lack of geometric continuity in the quadrilateral's 2 upright sides, between the (horizontal) treads and the (inclined) first and third parts of the broken ascending facet, as well as between the (almost vertical) risers and said 2 (inclined) parts of the ascending facet, induces the need for a very short length of transition area, the wing's metallic skin being moulded to a transitional shape changing smoothly and not protruding in the air.

3e Insufflation points are installed in the potential area of a configuration with double fore-"upright" edges as follows:
an insufflation point the length of treads and risers is installed at each one of them, considering that risers and treads are sort of short facets in a series of successive bulging (but not receding) dihedrals; and
the adjacent areas of the ascending facet's first and third parts near the "upright" edges are insufflated in accordance with the foregoing about edge-direction dependent insufflation (3a. above); 4 insufflation points are installed upstream of the A-upright edge, and in the case of a bulging breaking point of the bulging up dihedral 4more issufflation points downstream of the B-upright edge.

4 Cross-examining and experimenting are of vital importance for all items discussed in this chapter, since the area is critical for creation of lift force.

5 Adoption of the 2 optimisation steps (interpolation of facets and insufflation of air) aims at 2 purposes:

5a First purpose: To achieve smoothness to the second degree or more onto the diagram of the virtual air front (incoming air meeting insufflated air), that is the air front curve height versus the points of the cross section of the wing. (In geometric terms, the diagram line to be not only curved instead of broken-rectilinear, but also smooth-curved instead of hiccuped-curved.)

5b Second purpose: to keep within bounds the minimum value of (negative) pressure, or maximum pressure in absolute value, at key points of the wing's upper surface (as well as of other aircraft parts), most notably at the area just up- and rearwards of the leading edge, lest the aircraft's metallic surface undergo cavitation and wear of material.

5c Given that the pressures diagram is a function of the air front diagram's second derivative, second-degree or even higher-degree air-front smoothness is a requisite in order to get a pressures diagram with a moderate maximum value.

5d A mathematical technique round these 2 restrictions is:
at the very start, to calculate the aerodynamic qualities suitable for the projected range of flight velocities, hence the wing's performance, hence its conduct versus the incoming air,
A to begin with a desired diagram of (negative) pressures,
B then to integrate to the second degree (or to a higher degree) so that a needed virtual air front curve turns up,
C next, to define the optimisation possibilities from facet interpolation and air insufflation in order to attain or just to approximate this air front curve, and
finally, to determine, by executing experiments and trials, and finalise these 2 issues in order to achieve the desired aircraft velocities range.

O Wing underside (Variable geometry) (articles 1 to 6)

1 1a The sought element in the present 2-step proposal is the virtual front curve between the 2 air masses (incoming and insufflated air), the most efficient one, to suit the desired range of flight velocities; For this, calculations, interpolation of facets and insufflation of air take place, through quantifying, testing in wind tunnels, and performing trials in flight.

1b Attention is paid in insufflating all possible areas and points of
A. air ramming-in and compressing,
B. turbulence and other kinds of discontinuity,
C. abrupt alteration of surface direction, and
D. standard-to-variable geometry alteration, as well as in applying suction at places, and n defining case- and mission-specific air dosage.

1c Said element is desiredly tracing-safe, undetectable; in this, keeping the edges of dihedrals absolutely sharp is vital, and processing the air accordingly prior to insufflation and to final discharge can serve.

1d This being said, simplicity is also desirable; and concerning variable geometry design, facet interpolation is not liable to serve in adopting it in the lower side of the wing, and is not implemented (cf 4a. below); on the contrary, air insufflation is all the more candidate to be effected in this chapter.

2 2a The various kinds of variable geometry assist flight manoeuvres and flight in temporary conditions (low speed flight, etc.) for which it is not advisable to assign the regular, standard geometry of the aircraft. There exist certain kinds of such design philosophy, variable geometry, in which facets can be integrated and in which air insufflation can greatly serve, cited previously (cf D.3b. above); such design prospects are discussed in the following.

2b The rear part of the wing (50, 51) rotates downwards (62) round a longitudinal (to the wing) axis embedded in the lower wing surface (54) (and in line with the wing tip), which upon rotation becomes the edge of the resulting dihedral, in the way of a flap (cf 3. below).

2c Besides this, insufflation (61) in the space where the rotation of said part takes place, without rotating itself, can serve in the role of a virtual flap element (cf 6. below).

3 3a Transformation of the flat lower wing side (25, 50) into a receding dihedral (54) spanning the best part of the half-wing's length, by way of a flap, helps sustain flight in low speeds, and it can serve as aileron to be of service in extreme manoeuvring; it can be effected at will according to the pilot's needs and retracted back to its regular configuration thereafter.

3b Parts of both the upper (28, 53, 51) and lower (25, 50) sides of the wing rotate to accommodate the shape of the dihedral (54). The lower side's rotation is greater than that of the upper side. The lower side's back part (50), which is the low-facet of the downwards-revolving (62) trailing dihedral (26), rotates round a long articulation [A] (54) directed in line with the wing tip or thereabouts, embedded in the wing's lower metallic skin; this articulation (54) becomes the edge of the temporary receding dihedral of this low-facet (the wing's lower side) (25, 50).

3c The upper side's back part (51), i.e. the revolving trailing edge's (26) up-facet (the descending one), also rotates round a corresponding upper articulation [B] (55) which
  is embedded in the foremost part of the descending facet (51), and
  is part of the edge between the descending facet (51) and the facet interpolated (52) to the bulging up dihedral. This articulation (55) moves backwards during the flap-down move (62), accordingly to suit the geometry of the revolving-down trailing dihedral (26); in so doing, it trails with it an oblong trapezoidal part (52) of the metallic upper skin of the wing. The trapezium (52) (designated extra facet) is a locally redundant part of the facet interpolated to the bulging up dihedral; it stays hidden under the regular skin (designated proper facet) (53) in the flap-up situation, and is meant for filling a gap in; the gap results as the revolving trailing dihedral's (26) geometry pulls the articulation (55) rearwards (in the flap-down move) (62).

3d The moving part of the upper side of the wing (51) extends telescopically in this way, backwards and slightly (combinedly) downwards and upwards: downwards, its rearmost part (the trailing dihedral's extreme up-facet) (26/51), and upwards, its foremost part, that is the 2 narrow areas on either side of the articulation [B] (55): a narrow zone of the descending facet (51/55) and the extra facet (52). The greater (wider) part of the wing in front (28, 25) stays inmovable in relation to the aircraft's body, while its comparatively smaller (narrower) flap-wise rear part 50, 51) moves down (62) and up, supported by said articulation [A] (54). The proper facet (53), which is the interpolated (to the bulging up dihedral) facet's part corresponding in length to the extra facet (52) (that is, to the flap's length), can rotate slightly upwards round its foremost line disposing an articulation [C] (56) embedded in the edge of the dihedral (56) between the interpolated facet (53) and the ascending one (28), in order to meet the extra facet's (52) geometric necessity to slightly rise with its articulation [B] (55) in the flap-down move (62).

3e That is, A the width of the the wing's lower side (25, 50) is the same in the 2 modes, namely being flat overall in the flap-up mode and being articulated in the flap-down (62) mode; on the contrary, the upper side's width (28, 53, 51) extends in the described way (28, 53, 52, 51) in the flap-down (62) mode, creating a considerably greater total value of negative pressure and of the resulting lift force, like a traditional flap does.

B the width of both the proper facet (53) and the extra one (52) equals that of the facet interpolated to the bulging up dihedral;

C the articulation [B] (55), between the extra facet (52) and the moving-down (62) up-facet (51) of the flap (a part along the trailing dihedral), is aligned with the edge (55) between the interpolated facet (53) and the descending one (51) while in the flap-up position, and moves back and slightly up during the flap-down move (62), in so doing trailing along the extra facet (52) which slides back telescopically under the proper facet (53); and D the articulation [C] (56), between the proper facet (53) and the ascending one (28), is aligned with the edge between the interpolated facet and the ascending one, and permits the proper facet (53) to rotate slightly upwards radially, while the slightly rising extra facet (52) slides out from underneath this proper facet (53), during the flap-down move (62).

3f In each one of the 2 half-wings, at the 2 extremes of the rotating-down flap (50, 51) and at the corresponding places of
  the bulging trailing dihedral's immobile parts on either side of the rotating flap, and
  the extra facet (52), there are 4 pairs of subsidiary metallic parts meant for filling gaps in (the 3 of these pairs) and for upgrading aerodynamics (the third one of the 4 pairs):

A 2 flat triangular covers at 80° to the flap's length, to keep closed the 2 openings between the flap's 2 bulging-trailing-dihedral-sides (50, 51) (one, part of the lower side of the wing, and the other, part of the descending face of the wing), which on down-rotating stay open;

B 2 flat triangular covers at 80° to the flap's length, to keep closed the corresponding openings of the bulging trailing dihedral's immobile parts on either side of the revolving flap, which gape open after the flap's revolving-down;

C 2 flat parts at the flap's 2 extremes, parallel to the triangular covers mentioned in the previous paragraph (3f.A above), with a mechanism each to slightly rotate it and to protract it further down from the respective flap extreme, fin-wise, in order to restrain incoming air from spreading out sidewards and to confine it under the flap for better aerodynamic function in low speeds. The flap being down, the 2 fins in deployed position, their 2 planes are at an angle slightly wider than 90° to the now-rotated low-facet of the trailing dihedral's flap-part, in order to keep incoming tracing beams from reflecting back 180° to undesired directions; and D 2 flat parts at the proper facet's 2 extremes, with suitable dimensions to keep airtight-shut the 2 resulting openings of the wing's upper skin at the moment the flap revolves down (62) and the proper facet (53) (and the articulation B) slightly rises up, by accordingly up-protracting perpendicularly to the bulging up dihedral's interpolated facet (53).

3g The foregoing is a detailed description of a first-proposed flap configuration whereby its up-facet (51) is a lengthwise part of the descending facet in its entire breadth and the extra facet (52) is a lengthwise part of the up dihedral's interpolated facet in its entire breadth; though according to particularities of design and of projected missions, the extra facet (52) can be defined narrower than the upper interpolated facet, and even the up-facet (51) can be defined narrower than the descending facet or just a small part of it, entailing a narrow flap.

4 Air acquisition, air insufflation, air recovery, air disposal:

4a The receding dihedral (54) between the wing's firm lower side (25) on one hand, and its down-rotating rear part (50) which is the revolving flap's (50, 51) low-facet on the other hand, is not of the dihedral type that can receive an optimising interpolated facet (cf E.1d. above), or the situation would be inordinately complicated. For this reason air insufflation is indispensable for achieving aerodynamic optimisation, through insufflation slots in both facets (57, 58), this being an exception to the rule of only installing slots at the fore-facets of receding dihedrals (cf F.3a. above).

4b A first estimate of acquisition slots, disposed perpendicular to the aircraft's longitudinal axis (cf F.2a. above), is: 4 slots (59) at the firm part (25) of the lower side of the wing, evenly distributed between the leading edge (45) and the articulation [A] (54).

4c A first estimate of insufflation slots, disposed parallel to the receding dihedral's edge (54) (cf F.3b. above), is:
  3 slots (57) at the dihedral's fore-facet (25) (at the firm part of the wing's lower side):
  one slot just upstream of the edge (of the articulation [A]) (54), the second one at a distance of 30 cm from the edge and directed backwards at 45° to the lower side's plane, and the third one certainly behind the rearmost acquisition slot (59) and positioned at a distance of 90 cm from the edge (54), directed backwards at 30° to said plane, and
  2 slots (58) at the dihedral's aft-facet (50) (at the trailing dihedral's low-facet, after the articulation [A] of the flap): one slot just downstream of the edge (of the articulation [A]) (54) and the other one at a distance of 30 cm from the edge.

4d A first estimate of recovery slots, disposed parallel to the edge (54) (cf F.6a. above), is 2 slots at the dihedral's aft-facet (60): one at a distance of 45 cm from the edge (54) (i.e. 15 cm behind the second insufflation slot) and the other one at a distance of 90 cm from the edge (or less, if the flap's dimension does not permit so) (cf 6e. below).

4e A first estimate of discharge points (or slots, for efficient case-specific dispersion of the spent air, cf F.8b. above) is: a number of points or short slots, to be determined on the basis of trials and experiments, are installed at the upper surface of the craft or in the outer shell of the aircraft's turbofans to dilute there among the bypassing air, or the air is channelled to spread in the turbojets' hot exhaust and be indetectable while entering the free air stream.

4f During the flap-up mode the insufflation slots (57, 58) do not operate, and the recovery slots' air intake function operates in the way of acquisition slots (cf 6e. below).

5 In conclusion to the above:

5 a This is the only case whereby facets of the aircraft move, and it is effected in an expert way; it is possible to use only one half-wing's flap-down function, serving in the way of an aileron for executing rolling manoeuvres: even performing an aileron roll, or a controlled vertical spin, deeds with plenty of g's, unthinkable so far in stealth design and flight.

5b The available space inside the wing is affected after the flap's revolving down (62); it is a design matter: the way to manage and use its extended, warped form during the flap-down move (62).

5c The sliding move between the proper facet (53) (being above, firm) and the extra one (52) (being below, sliding) is powered by a bespoke mechanism which disposes a breaking facility, in order to help the flap stay firm in whatever inclination it is needed to function along its down move (62).

5d In case the allotted breadth of the bulging up dihedral's interpolated facet (53 is too narrow to provide for the necessary span of the sliding function, this one being dependent on the fact that too much down-revolution (62) of the flap ((50, 51) carries along a substantial back move of the articulation [B] (55), an additional facet is installed in-between the proper facet (53) and the extra one (52), the 2 of them being in position to slide on its 2 sides respectively, thus doubling the workable span of the sliding function; in such a case a braking facility is installed on both the additional facet's sides upon the sliding function, for efficiently stabilising the flap's revolving-down (62).

5e In the flap-up mode the wing is not wanting in anything as far as it concerns its stealthiness in comparison with its alternative condition, nonexistence of the flap-down possibility.

5f The fact that the proper facet's (53) rearmost border lies over the extra facet's (52) corresponding border (and over the articulation [B] (55), although embedded) in the flap-up mode (that is, high flight speeds being prevalent in the middle of a mission), and not the opposite (extra facet over proper facet), is beneficial for protection against tracing beams predominantly incoming from front directions, preventing rushing air from entering thin cavities between superposed elements.

Regardless, there can be the opposite situation, abiding by other design priorities, namely the extra facet being located over the proper one; in such a case the extra facet's foremost border is inclined to the horizontal by a 60° angle: to serve in anti-radar function, and to minimise the resistance to air.)

The wing loses in sturdiness through the addition of the flap-down and flap-up capability (compared with its being firmly connected in one piece with the whole of the aircraft), but the aircraft benefits importantly from this in agility and in taking off/landing.

5g It is worth noting that it is certainly possible to install conventional configuration flaps, taking into consideration the non-parallelism comment stated earlier (C.2h. above), but the present flap proposal leaves the profile of the wing unaffected in the flap-up mode.

6 Virtual flap:

6a Instead of having the rear part of the wing rotate down to perform like a flap would, a virtual flap, generated by insufflated air (61), can be adopted in roughly the same part of the wing; or it can be applied in addition to the mechanical flap (50, 51) previously described (2b., 3. above), the 2 of them in concurrence conferring an augmented aerodynamic result.

6b The function of the virtual flap is feasible thanks to insufflation slots (61) installed in the rear part of the wing's lower side (50), their air dosage being expertly determined for each one of the 2 modes: functioning alone, or combined with the previously discussed down-revolving flap (62).

6c The advantage from using the virtual flap is 3-part:
The operation is instantaneous: it comes down to just enacting the insufflation, before the mechanical arrangements for the flap-down operation can be effected;
The virtual flap-on operation can be effected independently of any mechanical malfunction of the (certainly more efficient aerodynamically) flap-down operation; and
The virtual flap leaves the stealth quality of the wing's lower side unaffected. 6d A first estimate for insufflation slots regarding the virtual flap is:
3 insufflation slots (61) spanning the whole of the half-wing's length, parallel to the trailing edge, at distances 30, 45 and 75 cm from it, operating at variable output (air dosage), functioning in 3 modes: either the second of them only, or the other 2 only, or all 3.
The 2 slots of the aft-facet of the revolving flap's dihedral (58), described previously (4c. above), are also operational with the virtual flap, engageable at will.

6e The recovery slots of the aft-facet of the revolving flap's dihedral (60), described previously (4d. above), stay idle in virtual flap-on mode; they function as acquisition slots when neither the mechanical flap nor the virtual flap are actuated (cf 4f. above).

6f Trials and experiments on the virtual flap mechanics are indispensable, since it is a novel turn in design.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A stealth craft including a multi-faceted dihedral planform extending in a direction from a front to a rear of the stealth craft, the planform comprising:
a first set of facets followed by a second set of facets along the direction of the planform, each of the facets from the first and second sets being a substantially flat surface, each of the facets from the first and second sets being separated from adjacent facets by sharp straight edges,
insufflation slots configured for blowing a fluid, the insufflation slots extending in a direction transverse to the direction of the planform,
wherein the first and second sets of facets have an angle of incline that is ascending and descending, respectively, with respect to the direction of the planform, and
wherein the insufflation slots are provided in selected facets of the first and second sets of facets to insufflate the fluid to form a cushion along the multi-faceted dihedral planform for improving aerodynamics and stability.

2. The stealth craft of claim 1, further comprising recovery slots that recover insufflated fluid.

3. The stealth craft of claim 2, wherein the recovery slots include means for recirculating the recovered insufflated fluid and re-insufflating it downstream of the multi-faceted dihedral planform.

4. The stealth craft of claim 1, wherein the multi-faceted planform is a wing, and
wherein the first set of facets comprises at least two facets defining a front portion of the wing.

5. The stealth craft of claim 4, wherein the insufflated fluid is incident air collected through outside air collection vanes.

6. The stealth craft of claim 5, further comprising means for processing the collected incident air and to expel it in a way to achieve a desired pressure distribution of the cushion.

7. The stealth craft of claim 6, further comprising recovery slots disposed on a surface forming a recovery region located away from any insufflation slots, the recovery slots facilitating the recovery of insufflated fluid.

8. The stealth craft of claim 7, wherein the recovery slots include means for recirculating the recovered insufflated fluid and re-insufflating it downstream of the multi-faceted dihedral planform.

9. The stealth craft of claim 8, further comprising a recovery shield to block at least a portion of the cushion from traveling beyond the recovery region.

10. The stealth craft of claim 4, further comprising blower means for generating insufflated air in a manner aimed to achieve a desired pressure distribution of the cushion.

11. The stealth craft of claim 10, further comprising recovery slots disposed on a surface forming a recovery region located away from any insufflation slots, the recovery slots facilitating the recovery of insufflated fluid.

12. The stealth craft of claim 11, wherein the recovery slots include means for recirculating the recovered insufflated fluid and re-insufflating it downstream of the multi-faceted dihedral planform.

13. The stealth craft of claim 12, further comprising a recovery shield to block at least a portion of the cushion from traveling beyond the recovery region.

14. The stealth craft of claim 3, wherein the insufflation slots and the recovery slots are coupled via piping that channels air to and from associated facets.

15. The stealth craft of claim 14, wherein the piping channels air at a speed and volume selected automatically by an on-board computer in response to at least one of speed of the craft, acceleration of the craft, weather and wind conditions.

16. The stealth craft of claim 4, wherein the front portion of the wing includes a flight deck window portion of a stealth aircraft and the multi-faceted dihedral planform extends from a front tip of the stealth aircraft to a rearmost portion thereof.

17. The stealth craft of claim 1, further comprising a fin, the fin also having a multi-faceted dihedral planform as well as a set of at least one insufflation slots and points for creating an appropriate aerodynamic air cushion.

18. The stealth craft of claim 1, further comprising a wing having a multi-faceted dihedral planform, the wing including a moving member which retracts downwardly creating a gap between a top most point facing the wing and an uppermost point in the wing from which the moving member retracts away from, and wherein this gap is shielded by a slidably engaging, hinged planar component.

19. A stealth craft including a wing defining a multi-faceted dihedral planform extending in a direction from a front to a rear of the wing, the planform of the wing comprising:
a first set of facets followed by a second set of facets along the direction of the planform of the wing, each of the facets from the first and second sets being a substantially flat surface, each of the facets from the first and second sets being separated from adjacent facets by sharp straight edges,
insufflation slots configured for blowing a fluid, the insufflation slots extending in a direction transverse to the direction of the planform of the wing
wherein the first and second sets of facets have an angle of incline that is ascending and descending, respectively, with respect to the direction of the planform of the wing, and the insufflation slots are provided in selected facets of the first and second sets of facets to insufflate the fluid to form a cushion along the multi-faceted dihedral planform of the wing for improving aerodynamics and stability.

20. The stealth craft of claim 19, wherein the wing includes a moving member that retracts downwardly creating a gap between a top most point facing the wing and an uppermost point in the wing from which the moving member retracts away from, and wherein this gap is shielded by a slidably engaging, hinged planar component.

* * * * *